(12) United States Patent
Scott et al.

(10) Patent No.: US 8,600,400 B2
(45) Date of Patent: Dec. 3, 2013

(54) DEVICE AND METHOD FOR CREATING DATA RECORDS IN A DATA-STORE BASED ON MESSAGES

(75) Inventors: Sherryl Lee Lorraine Scott, Toronto (CA); Julia Murdock Thompson, Kitchener (CA)

(73) Assignee: BlackBerry Limited, Waterloo (CA)

( * ) Notice: Subject to any disclaimer, the term of this patent is extended or adjusted under 35 U.S.C. 154(b) by 367 days.

(21) Appl. No.: 12/908,584

(22) Filed: Jan. 5, 2011

(65) Prior Publication Data

US 2012/0101818 A1    Apr. 26, 2012

(30) Foreign Application Priority Data

Oct. 20, 2010  (EP) .................................... 10182292

(51) Int. Cl.
*G06F 17/00*     (2006.01)

(52) U.S. Cl.
USPC ..................................................... 455/456.1

(58) Field of Classification Search
USPC ....................................... 704/231; 455/456.1
See application file for complete search history.

(56) References Cited

U.S. PATENT DOCUMENTS

| 5,790,974 | A | 8/1998 | Tognazzini |
|---|---|---|---|
| 6,446,004 | B1 | 9/2002 | Cao et al. |
| 6,505,167 | B1 | 1/2003 | Horvitz et al. |
| 6,983,310 | B2 | 1/2006 | Rouse et al. |
| 7,139,722 | B2 | 11/2006 | Perrella et al. |
| 7,206,569 | B2 * | 4/2007 | Erskine et al. ................. 455/405 |
| 7,515,917 | B2 * | 4/2009 | Casey ......................... 455/456.1 |
| 7,606,580 | B2 * | 10/2009 | Granito et al. .............. 455/456.1 |
| 7,970,390 | B2 * | 6/2011 | Fraccaroli .................... 455/414.3 |
| 8,224,348 | B2 * | 7/2012 | Bolon et al. ................ 455/456.1 |
| 2002/0120703 | A1 | 8/2002 | Kaufman et al. |
| 2003/0092454 | A1 | 5/2003 | Halim et al. |
| 2004/0044644 | A1 | 3/2004 | Brady et al. |
| 2005/0021858 | A1 | 1/2005 | Ruston et al. |
| 2005/0149858 | A1 | 7/2005 | Stern et al. |
| 2007/0073810 | A1 | 3/2007 | Adams et al. |
| 2007/0079260 | A1 | 4/2007 | Bhogal et al. |
| 2007/0150513 | A1 | 6/2007 | Vanden Heuvel et al. |

(Continued)

FOREIGN PATENT DOCUMENTS

| EP | 1109121 A2 | 6/2001 |
|---|---|---|
| EP | 1484703 B1 | 5/2007 |

(Continued)

OTHER PUBLICATIONS

Extended European Search Report dated Apr. 7, 2011.

(Continued)

*Primary Examiner* — Susan McFadden
(74) *Attorney, Agent, or Firm* — Brett J. Slaney; Blake, Cassels & Graydon LLP

(57) ABSTRACT

Updating a data-store associated with an electronic communications device includes wirelessly communicating an electronic message. A location identifier representative of a physical location is identified within the electronic message. The physical location of the electronic communications device is measured or estimated as needed, after which validating the location identifier occurs when the measured or estimated physical location is calculated to be within a threshold distance of the physical location represented by the location identifier. Initiating creation of a new data record in the data-store is then performed, with the new data record storing at least the validated location identifier and a time identifier.

21 Claims, 16 Drawing Sheets

(56) References Cited

U.S. PATENT DOCUMENTS

| | | |
|---|---|---|
| 2007/0226204 A1 | 9/2007 | Feldman |
| 2007/0281689 A1 | 12/2007 | Altman et al. |
| 2008/0034047 A1 | 2/2008 | Rosenberg et al. |
| 2008/0066018 A1 | 3/2008 | Zinn et al. |
| 2008/0195312 A1 | 8/2008 | Aaron et al. |
| 2009/0029724 A1 | 1/2009 | Hardy et al. |
| 2009/0152349 A1 | 6/2009 | Bonev et al. |
| 2009/0233628 A1 | 9/2009 | Vendel |
| 2009/0235280 A1 | 9/2009 | Tannier et al. |
| 2004/1243677 | 10/2009 | Curbow et al. |
| 2010/0228753 A1 | 9/2010 | Jain et al. |

FOREIGN PATENT DOCUMENTS

| | | |
|---|---|---|
| EP | 1808802 A1 | 7/2007 |
| EP | 2224388 A1 | 9/2010 |
| JP | 11259568 | 9/1999 |
| WO | 9907118 A1 | 2/1999 |
| WO | 2004029772 A2 | 4/2004 |
| WO | 2005079336 A2 | 9/2005 |
| WO | 2007121329 A1 | 10/2007 |

OTHER PUBLICATIONS

Riekki, Jukka et al.,"Genie of the net, an agent platform for managing services on behalf of the user", Computer Communications,, vol. 26, No. 11, Jul. 1, 2003, pp. 1188-1198, Chapters 3.1 and 3.2 p. 1191, left-hand col. —p. 1192, left-hand col., chapter 4.1, p. 1193, line 3-line 16,chapter 4.2 p. 1193 line 24-line 31, Elsevier Science Publishers BV, Amsterdam, NL.

Ziade, F.; Search Report from corresponding PCT Application No. PCT/CA2011/001156; search completed Jan. 12, 2012.

Beard D. et al, "A Visual Calendar for Scheduling Group Meetings" Proceedings of Conference on Computer-Supported Cooperativework, Oct. 7-10, 1990, Los Angeles, New York, NY, US, Oct. 7, 1990, pp. 279-290, XP001013928.

Smith M A et al, "Association for Computing Machinery: Visualization Components for Persistent Conversations" Chi 2001 Conference Proceedings. Conference on Human Factors in Computing Systems. Seattle WA, Mar. 31 to Apr. 5, 2001, New York, NY: IEEE, US.

TechCrunch, Google Calendar is Live, Michael Arrington, Apr. 12, 2006 http://techcrunch.com/2006/04/12/google-calendar-is-live/.

BlackBerry GPS Navigation Tips: Mastering BlackBerry & TeleNav Navigator—CIO.com—Apr. 8, 2009 http://www.cio.com/article/488728/BlackBerry GPS Navigation Tips Mastering BlackBerry TeleNav Navigator.

Easy2Add—Quickly create new events in your Outlook Calendar (appointments, meeting . . . ) http://www.easy2add.com.

How Easy2Add Works and How to Use It: http://www.easy2add.com/Easy2Add Documentation.pdf.

What Is Liaise? http://www.liaise.com/solution.

Mia K. Stern—Dates and Times in Email Messages—IBM Research, Cambridge, MA 021412.

Nardi et al.—Collaborative Programmable intelligent agents, Apple Computer, Advanced Technology Group, Mar. 1998 http://www.miramontes.com/writing/add-cacm/.

\* cited by examiner

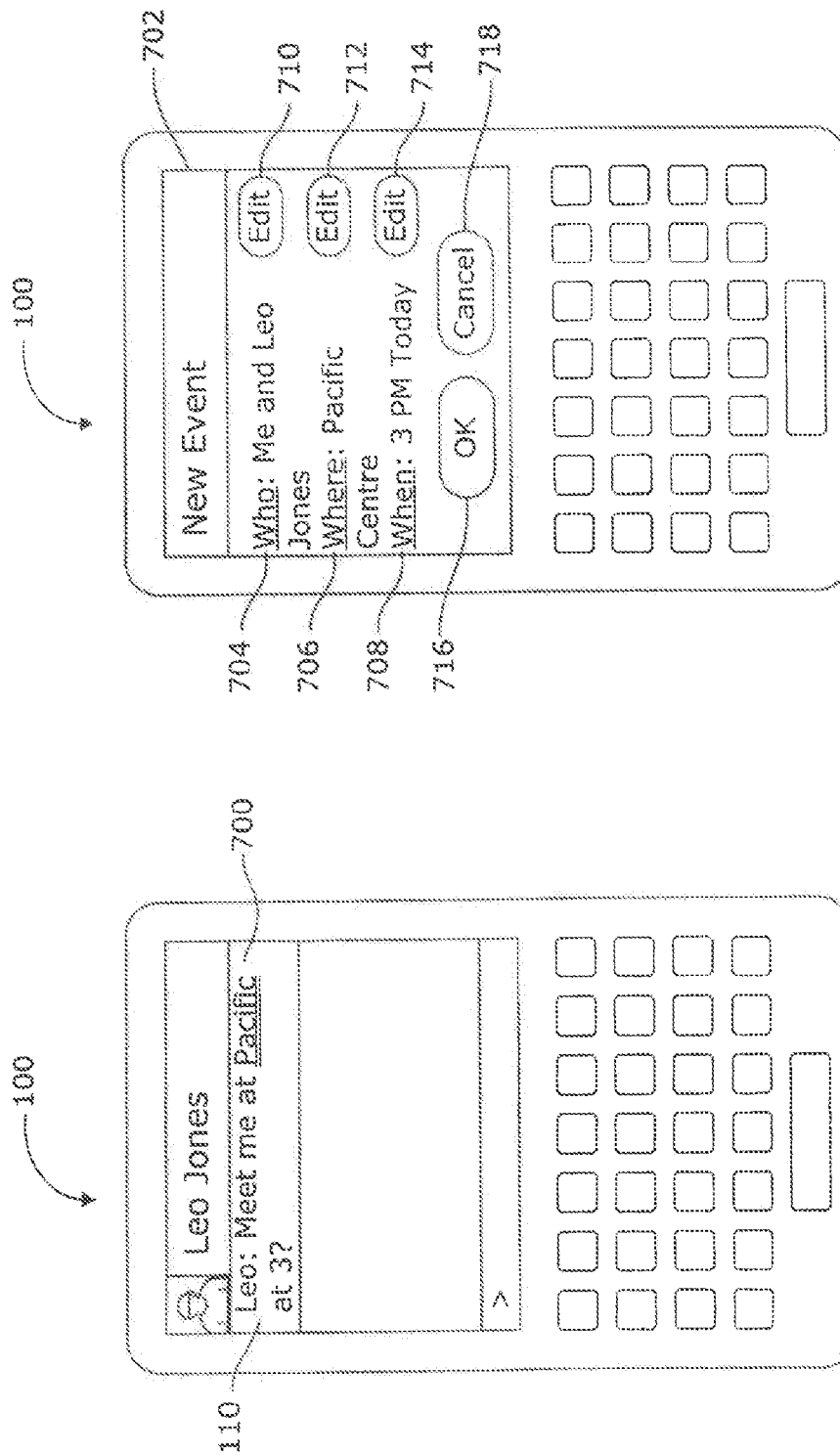

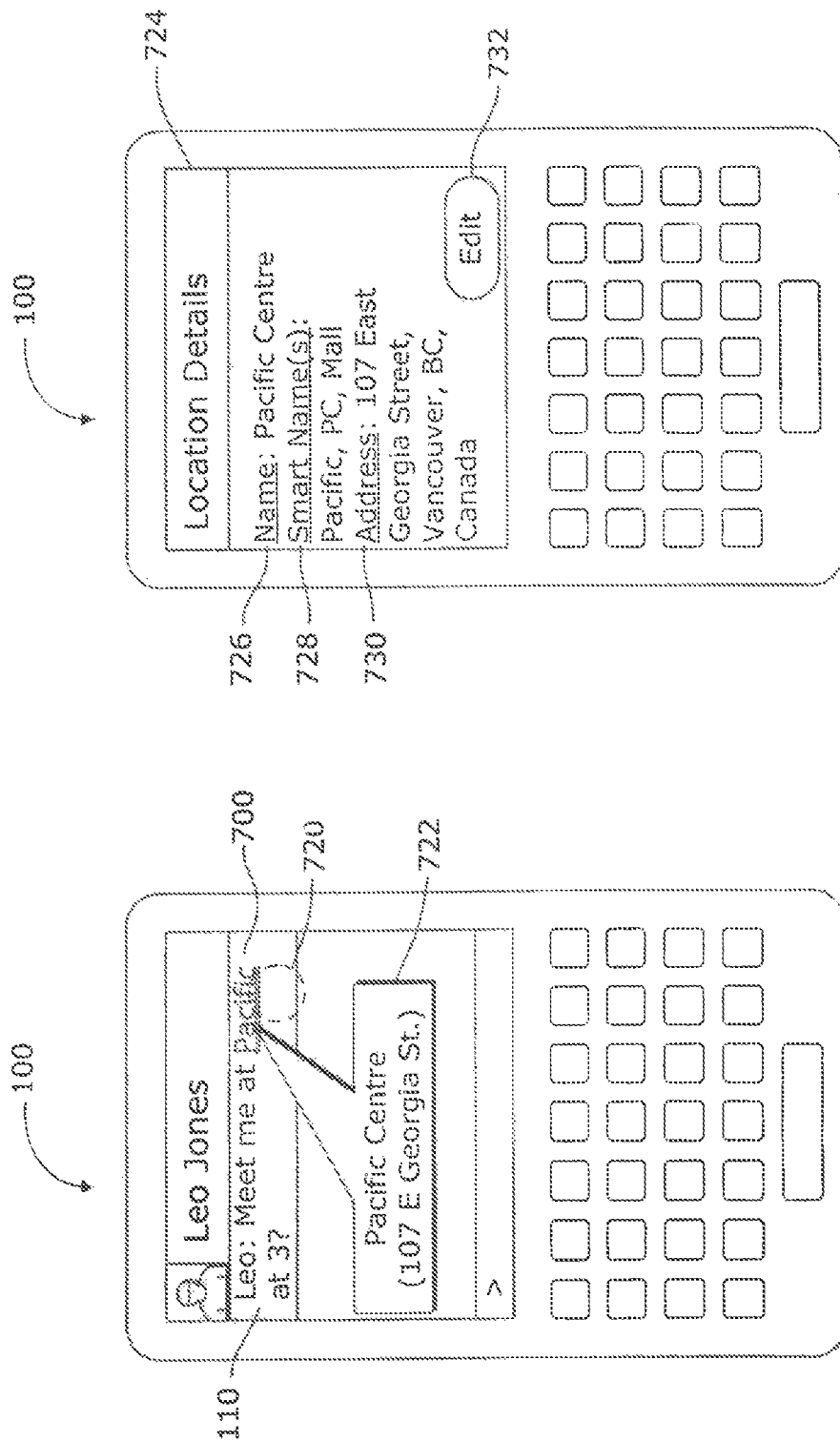

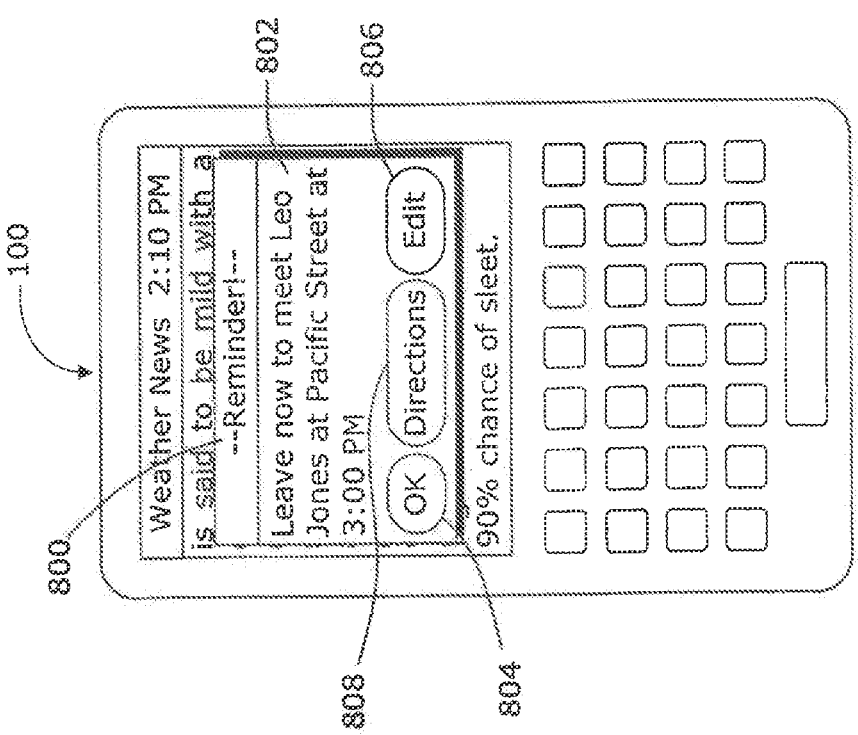

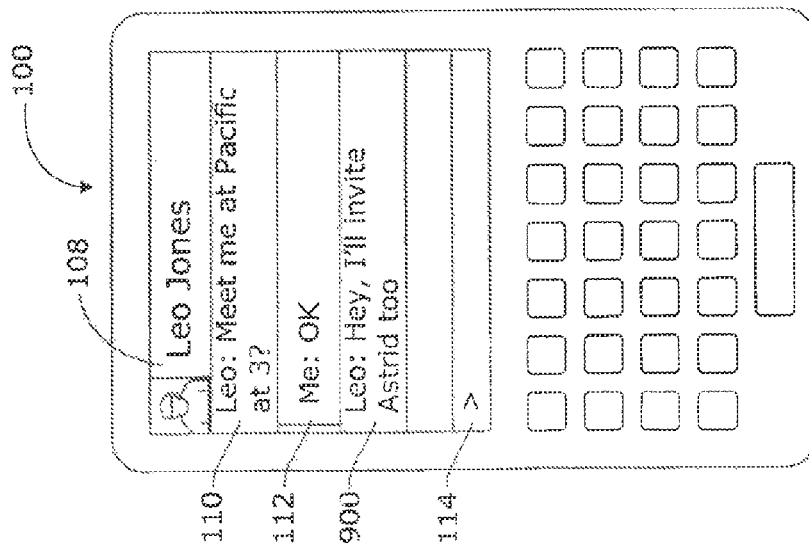

Fig. 10a

| ID 204 | Location 206 | Date-time 208 | Attendees 210 | Confirmed 212 | Duration 1000 |
|---|---|---|---|---|---|
| ... | ... | ... | ... | ... | ... |
| 00834 | Pacific Street, Vancouver, BC, Canada | May 14, 2010 3:00 PM | Leo Jones; Me | True | 1 hour |

Astrid Koda
Astrid: How about coffee at 330?
Me: I'm busy until 4, another time?

Astrid Koda
Astrid: How about coffee at 330?
Me: OK
Me: Wait. I'm busy until 4 PM today. Another time?

106, 108, 110, 112

DEVICE AND METHOD FOR CREATING DATA RECORDS IN A DATA-STORE BASED ON MESSAGES

CROSS-REFERENCE TO RELATED APPLICATIONS

This application claims priority under 35 U.S.C. §119 to European patent application EP10188292.6, filed Oct. 20, 2010, the disclosure of which is incorporated herein by reference.

FIELD

This disclosure relates to the creation of data records in a data-store associated with a mobile electronic communications device.

BACKGROUND

Users of mobile electronic communications devices are often required to enter data, such as data representative of appointment or meeting details. The underlying data-store and its interface can be designed to make this accurate or convenient, with these two goals frequently being at odds with each other.

While accurate systems are often inconvenient to use and can even confuse users enough to cause errors or waste resources, convenient systems can also lead to errors because of, for example, data entry elements omitted or data values assumed for the sake of user convenience.

Inaccuracies resulting from poorly designed systems can lead to data records being needlessly created. This can waste memory in the device, as well as power in creating and then deleting or modifying spurious data records. Further, when the data-store is remote to the device that initiates the creation of the data record, bandwidth of the connecting network is taken up when creating or modifying data records. Waste of bandwidth results when unnecessary data records are created and then deleted or modified. Although in some cases these negative effects may be small, in a system with a large number of devices and servers, such effects can be magnified.

Improvements in usability and convenience of these devices often demand a minimal amount of data input from the user, as opposed to requiring a large amount of data to be entered. When relatively little data is to be entered, the chance of an unnecessary data record being created can increase, which compounds the waste of power and other resources.

It is desirable to have convenient or "smart" communications devices, but there is tension between usability/convenience and the efficient use of resources.

BRIEF DESCRIPTION OF THE DRAWINGS

FIGS. 7a-b are schematic diagrams of the mobile electronic communications device providing selection and confirmation of an event.

FIGS. 7c-d are schematic diagrams of the mobile electronic communications device providing information associated with a location.

FIG. 8a is a schematic diagram of the mobile electronic communications device showing a notification providing options for directions and editing.

FIG. 8b is a schematic diagram of the table of FIG. 2 modified to accommodate the notification of FIG. 8a.

FIG. 9a is a schematic diagram of the mobile electronic communications device showing a message containing a contact name.

FIGS. 9b-c are schematic diagrams of the table of FIG. 2 modified to accommodate the contact name of FIG. 9a.

FIG. 10a is a schematic diagram of the table of FIG. 2 modified to accommodate a duration field for conflict checking.

FIGS. 10b-c are schematic diagrams of the messaging application of the mobile electronic communications device showing automatic conflict avoidance messages.

DETAILED DESCRIPTION

Figure 1:
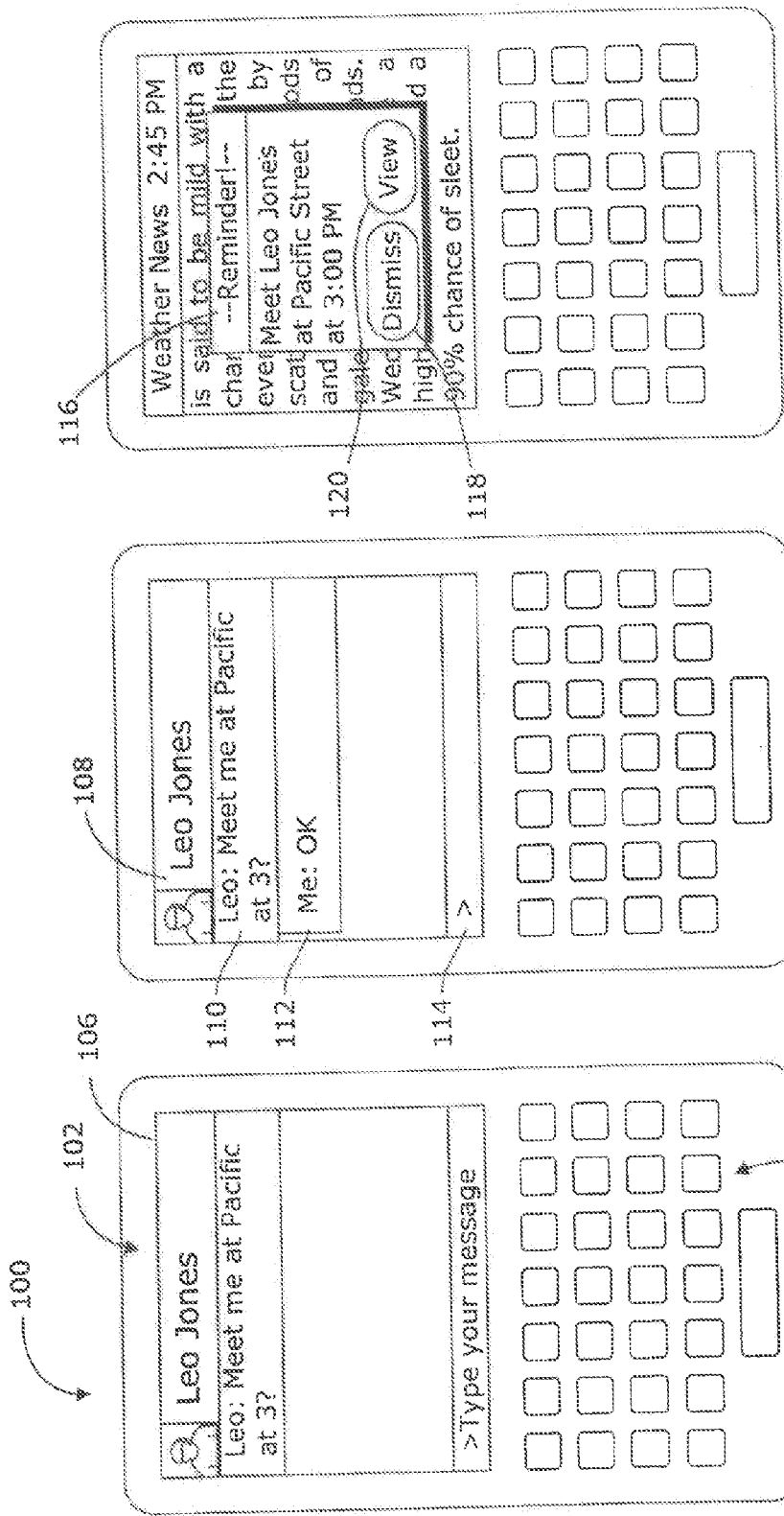
FIGS. 1a-c are schematic diagrams of a mobile electronic communications device running a messaging application.

FIGS. 1a-c show a mobile electronic communications device boo according to one embodiment. The mobile electronic communications device boo includes a display 102 and input interface 104, as well as internal components (see FIG. 11) such as a processor, memory, and communication subsystem.

The display 102 can include a liquid crystal display (LCD), organic light-emitting diode (OLED) display, active-matrix organic light-emitting diode (AMOLED) display, or the like. The display 102 can include a touchscreen, which is sometimes termed a touch-sensitive display. The display 102 is configured to display information to a user of the mobile electronic communications device boo.

The input interface 104 can include a mechanical keyboard as depicted, such as a full or reduced keyboard. Full keyboards include QWERTY keyboards and international equivalents (e.g., QWERTZ). Reduced keyboards include keyboards having many fewer keys than glyphs, such as 12-key telephone keypads. In addition to or instead of a keyboard, the input interface 104 can include a touchscreen, which may include a virtual keyboard. In some embodiments, such as those with a virtual keyboard, the input interface 104 and the display 102 can be considered the same physical device. In other embodiments, the input interface 104 includes a small number (e.g., one to five) of mechanical or touch-sensitive keys for navigating menus and responding to prompts.

A messaging application 106 is executed or run by the mobile electronic communications device 100. The messaging application 106 is an application capable of sending and receiving electronic messages, examples of which include instant messages (IM), short message service (SMS) messages, text messages, multimedia message service (MMS) messages, e-mail messages, chat messages, and the like. On the display 102 are shown elements of the messaging application 106 including a correspondent identification element 108, one or more received message elements 110, one or more sent message elements 112, and a message entry element 114.

The correspondent identification element 108 displays identifying indicia of the correspondent with which the user of the device 100 is communicating. Such identifying indicia can include any one or more of a name, username, screenname, user ID, phone number, email address, icon, image, digital photograph, or the like. The correspondent identification element 108 can be pulled from a contacts date-store, such as an address book application, file system, or database. In this embodiment, the identifying indicia shown in the correspondent identification element 108 includes a contact's photo and name.

Each received message element no includes message text received at the device 100 from the correspondent. Such messages can additionally or alternatively include one or more of images, video, sounds, maps, hyperlinks, address cards (e.g., vCards), and other such media.

Each sent message element 112 includes message text transmitted from the device 100 to the correspondent. As with received messages, sent messages can additionally or alternatively include other media as listed above.

The message entry element 114 is where a composed but not yet sent message is shown. The message entry element 114 can include a prompt, the greater-than sign, ">", and the non-message textual prompt, "Type your message", being examples.

When using the messaging application 106, a user of the device 100 can compose a message in the message entry element 114 using the input interface 104 and then initiate sending of the message to the correspondent's device by, for example, pressing a return key of the input interface 104. Messages sent by the user are echoed to the display 102 in sent message elements 112. Messages received from the correspondent's device are shown on the display 102 in received message element no. The interleaving of sent and received message elements 112, 110 reflects a conversation between the user of the device 100 and the remote correspondent.

As can be seen, the example message text shown in FIGS. 1a-b is directed to establishing a meeting's time and physical location. The remote correspondent, Leo Jones, sends the user of the mobile electronic communications device 100 an electronic message containing the text "Meet me at Pacific at 3?" In response, the user of the device 100 sends an electronic message containing the text "OK." To capture information contained in this communication and with it establish the meeting, the device 100 identifies within the received electronic message a location identifier (i.e., "Pacific") representative of a physical location. At around the same time, the device 100 measures its own physical location. The device 100 then validates the location identifier when its measured physical location is calculated to be within a threshold distance of the physical location represented by the location identifier. That is, the location identifier, "Pacific", is validated when the device 100 measures its physical location to be proximate to the physical location represented by "Pacific." Validation can also include formalizing the location identifier into a full descriptive name of the location. In this embodiment, the device also identifies a time identifier (i.e., "3") within the received electronic message. Once the location identifier is validated and the time identifier is identified (or calculated, when not present in a message), the device 100 initiates creation of a new data record in a data-store, such as a database stored on the device or a database stored at a remote server. The new data record stores at least a data record identifier, the time identifier, and the validated location identifier. In this way, the new data record concretely defines a meeting that was only casually established by the user of the device 100 and the remote correspondent, Leo Jones, during their conversation.

It is worth noting that the creation of this new data record and the meeting that it represents is transparent to the user of the device 100 and the remote correspondent, who are simply exchanging electronic messages. The correspondents do not have to knowledgeable in or even aware of the underlying technology used to establish their meeting.

At a predetermined time before the time identifier stored in the data record representative of the meeting, the device 100 can display a notification 116 on the display 102, as shown in FIG. 1c. The notification 116 can be issued by an application having access to the database containing the data record. Examples of such applications include an operating system, a calendar application, a task application, a reminder application, a memo application, a clock application, the messaging application 106, and the like. The notification 116 can be displayed overtop of or can interrupt another application currently running on the device (e.g., the Web browser illustrated) to capture the user's attention. In the example of FIG. 1c, the notification 116 is a popup dialog box and the predetermined time is 15 minutes prior (i.e., 2:45 PM) to the time represented by the time identifier (i.e., 3:00 PM). The notification 116 can be termed an alert, alarm, reminder, or warning, for example, and can include audio, visual, or tactile cues, such as tone, animation, or vibration. The notification 116 can include a selection element, such as an option to dismiss 118 the notification and an option to view 120 a representation of the data record. A similar or identical notification can be displayed on the remote correspondent's device as well.

This embodiment allows resources of the device to be conserved. For example, data records in the database are not created unless a location identifier is validated, which saves storage resources by not creating data records for invalid location identifiers. Wireless network resources are also saved because the database data record is created based on messages already being exchanged by the correspondents, rather than additional specific messages related to the database data record as is the case with a conventional email-based calendar invitation and acceptance.

Figure 2:
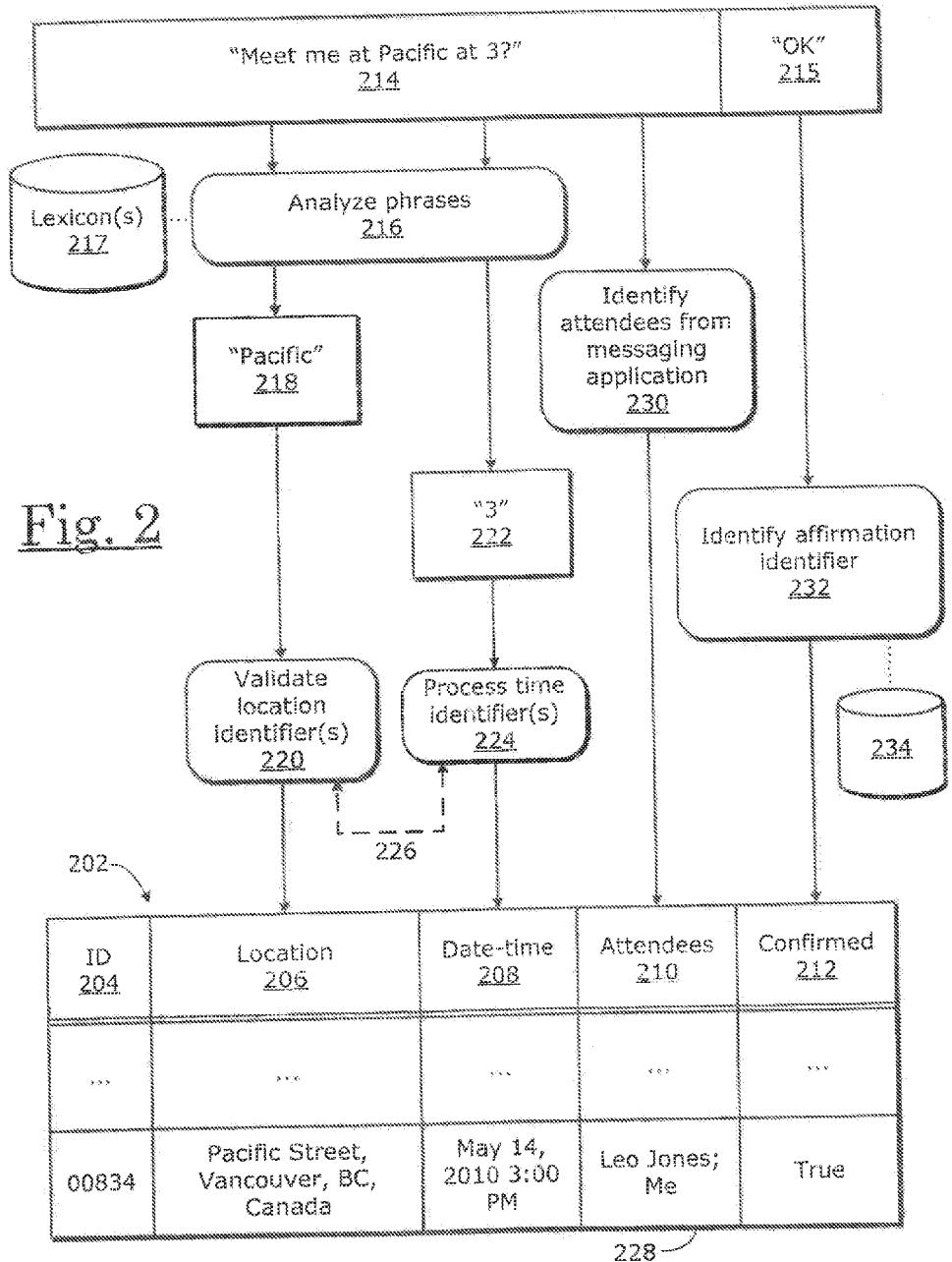
FIG. 2 is a schematic diagram of a method of updating a data-store associated with the mobile electronic communications device.

FIG. 2 schematically illustrates a method used to update the data-store for the embodiment described above. In this embodiment, the data-store is a database that has a table 202 having an ID field 204, a location field 206, a date-time field 208, an attendees field 210, and a confirmed field 212. Rows of the table 202 can represent meetings or other events. The ID field 204 stores a data record identifier that uniquely identifies a row of the table 202. The ID field 204 can be automatically generated when a new row is added and can be of a long integer data type. The ID field 204 can be used to link a row of the table 202 to a conversation. For example, the messaging application 106 can store associations of conversations to row IDs of the table 202, so that a meeting represented by a row can be uniquely correlated to a particular conversation. The location field 206 stores a location identifier as a full descriptive name of a location and thus can be of a text data type. In another embodiment, the location field 206 stores location identifiers as geographic coordinates. The date-time field 208 stores a time identifier and can be of a date-time data type, which specifies both a date and a time. The attendees field 210 stores at least one attendee identifier, such as a name, phone number, email address, or the like. In this embodiment, names are stored in a text-based list, with "Me" representing the user of the device 100. In other embodiments, another table is used to store attendee identifiers along with a foreign key corresponding to the ID field 204. The confirmed field 212 uses a Boolean data type to indicate whether the meeting represented by the row has been confirmed by the user of the device 100.

In this example, the remote correspondent, Leo Jones, sends the user of the mobile electronic communications device 100 an electronic message 214 containing the text "Meet me at Pacific at 3?" In response, the user of the device 100 sends an electronic message 215 containing the text "OK." The method acts on these messages as described below.

The received message 214 is analyzed, at 216, to identify a location identifier. Such analysis can include a brute-force phrase-by-phrase comparison of each phrase (a phrase being one or more adjacent words) in the body of the message with an electronically stored lexicon of physical locations 217. The lexicon 217 can include a purpose-built data-store with phrases (e.g., "Pacific") directly corresponded to full descriptive names of physical locations (e.g., "Pacific Street, Vancouver, BC, Canada"). An example of such a data-store is a database having a table storing indexed full descriptive names and another table storing a multitude of short/alternate forms along with a foreign key linked to the index of the associated full descriptive name. A many-to-many relationship between short/alternate forms and full descriptive names is expected. Further analysis techniques that can be used include logic to exclude small words (e.g., fewer than three letters), use or wildcards, use of regular expressions, or parsing to eliminate parts of speech not expected to form part of a location identifier. When a phrase being considered is found in the lexicon 217, the phrase is determined to be a location identifier. When a phrase is associated with more than one physical location, when more than one phrase in the message is determined to be a location identifier, or when a combination of such occurs, then disambiguation is required. In this example, the analysis determines that the phrase 218 ("Pacific") is a location identifier because the phrase 218 corresponds to several physical locations stored in the lexicon 217, one of which being "Pacific Street, Vancouver, BC, Canada."

To validate a location identifier, at 220, the mobile electronic communications device 100 measures its physical location. This measurement can be obtained using techniques such as use of a global positioning system (GPS), radio tower triangulation, wireless network triangulation, or the like. Measurement of the physical location can performed automatically in response to identification of the location identifier within the received electronic message.

The distance between the measured physical location of the device 100 and the physical location represented by the location identifier is then calculated. Such calculation can be based on a straight point-to-point distance, a map-based road distance, other mode of transportation distance, or the like. When the device 100 measures its location in terms of geographical coordinates, storing geographic coordinates of locations in the lexicon 217 can aid this calculation. A mapping application on the device 100 or a mapping server can also be used to aid the calculation of this distance.

The calculated distance is then compared with a threshold distance. When the measured location of the device 100 is found to be within the threshold distance of the physical location represented by the location identifier, the location identifier is validated. The threshold distance can be predetermined or preset by a provider of the device 100 or selected by the user of the device 100. Suitable values for the threshold distance include 100 meters, 500 meters, 1 kilometer, 10 kilometers, etc. The threshold distance can also be dependant of a user selection of a preferred mode of transportation (e.g., car, walking, public transport), which can be stored as a setting in the device 100. For example, selection of "walking" can preclude a larger threshold distance, such as 10 kilometers. In another embodiment, the threshold distance is calculated by multiplying the difference between a time associated with a time identifier obtained from the message 214 and a current time by a predetermined or preset rate associated with a mode of transportation. For example, if the obtained time (e.g., 3:00 PM) less the current time (e.g., 12:30 PM) is 2.5 hours and the rate is 3 kilometers per hour (e.g., walking has been selected), then the threshold distance is calculated to be 7.5 kilometers. (i.e., 2.5*3). The validation of the location identifier thus carries the connotation that the user of the device 100 can reach the location within a threshold amount of time and therefore serves as a coarse filter of specious location identifiers. Validation can be performed automatically in response to identification of the location identifier within the received electronic message and can be repeated for all location identifiers found in the received electronic message.

Thus, when more than one location identifier exists in a message, validation serves to disambiguate by eliminating location identifiers. However, if after validation there are still multiple location identifiers, further disambiguation can be performed, such as the device 100 displaying a prompt indicating validated location identifiers and receiving from the user a response to the prompt (See FIG. 4b).

The received message 214 is also analyzed, at 216, to identify a time identifier. This analysis is similar to that for the location identifier. However, a lexicon of date-time terms is used, also at 217. When more than one time identifier is found or when a time identifier is ambiguous (e.g., lacking an indication of date or AM or PM), then disambiguation may be required. In this example, the phrase 222 ("3") is determined to be a time identifier because the phrase 222 is found in the lexicon of date-time terms.

The time identifier is processed, at 224. In this embodiment, when the time identifier is ambiguous, the soonest time associated with the time identifier is selected. For example, if the current date-time is 12:30 PM, May 14, 2010 and the time identifier is "3", then the value 3 is assumed to represent an hour and specifically the next hour 3, namely, 3:00 PM on May 14, 2010.

In another embodiment, when the physical location cannot be measured, the physical location can be estimated based on the last-measured location of the device 100. For example, when the device 100 is moved indoors causing the GPS system to stop working, the last known GPS position can be used in place of the measured location. Later, when the device 100 again becomes capable of measuring its physical location, then the location identifier can be validated as above.

In another embodiment, when the device 100 cannot measure its physical location (e.g., no access to location services, an error, or an unknown location), the device 100 can prompt the user for his/her estimate of the travel time to arrive at the physical location (or of the arrival time).

In another embodiment, the location identifier can be validated or the travel time to the represented physical location can be obtained by referencing a previous trip to the location. For example, the device 100 can store data relating to a past trip to the physical location and use that data as an estimate to validate a location identifier.

When a physical location or travel time is estimated, validation of the location identifier and/or calculation of travel time can be performed or updated when measurement of the location becomes available. In addition, when a physical location or travel time is estimated, the user of the device 100 can be made aware by, for example, instances of the location text being highlighted in a predetermined way (e.g., grayed out), accompanied by a textual indicator (e.g., "est."), or an image (e.g., an icon of a double tilde, "≈").

In other embodiments, processing of time identifiers, at 224, can be performed in combination with the validation of location identifiers, at 220, particularly if the distance threshold used in location validation relies on a calculation involving time. This kind of combined approach, represented by arrow 226, can include use of iteration. For example, each time is iterated through each location, thereby testing each time against each location. The result is a set of pairs of valid locations and corresponding times, with invalid pairs being excluded. If this set includes more than one location-time pair, then the device 100 can issue a prompt to the user to make a definitive selection. The following pseudo-code summarizes this technique:

```
Start
    For each location represented by each location identifier do:
        For each time represented by each time identifier do:
            If the location can be reached within the time, then
    remember this location-time pair
        Loop until no more times (bounded by a maximum number to
    prevent an endless loop)
    Loop until no more locations (bounded by a maximum number to
    prevent an endless loop)
    If only one location-time pair exists, then select that location-
        time pair
    Else prompt user for selection of one of the location-time pairs
End
```

When no time identifier is found in the message 214, the processing, at 226, can include calculating a time using a measured current time, the measured physical location of the device 100, and the physical location represented by a validated location identifier. For example, the distance between the measured physical location of the device 100 and the physical location represented by a validated location identifier can be determined using any of the techniques described herein. Then, this distance can be divided by a rate of travel obtained by any of the techniques described herein. The resulting calculated time, which can be rounded to the nearest hour, quarter hour, etc, is used at the time identifier.

Alternatively, when no time is found in the message 214, later received messages can be examined for time identifiers. In this situation, the location identifier(s), whether validated or not, can be stored in a temporary area of memory until a time identifier is identified in a later message. It is worth noting here that the later message need not be from the sender of the initial message 214, but can be from another one of the correspondents, such as the receiver of the initial message 214.

A time may also be found in a message or set of messages before a location is found. That is, there is no constraint on the order in which times and locations are expected and identified.

Once a location and time are determined, creation of a data record in the database can be initiated. The location identifier (e.g., "Pacific Street, Vancouver, BC, Canada") is stored in the location field 206 of a new row 228 of the table 202. Similarly, the time identifier (e.g., May 14, 2010 3:00 PM) is stored in the date-time field 208 of the same row 228. A unique data record identifier (e.g., "00834") is stored in the ID field 204 of the row 228.

Additional information can also be stored in the new row 228 of the table 202.

For example, stored in the attendees field 210 can be attendee identifiers identified from the messaging application 106, at 230. In this embodiment, all participants (e.g., "Leo Jones" and the user of the device 100, "Me") in a conversation are identified as attendees. In other embodiments, particularly where there are more than two participants in a conversation (i.e., a group conversation), only the sender of the inquiring message 214 and one or more senders of affirming messages 215 are automatically identified as attendees. Conversation participants who do not inquire or affirm are not automatically identified as attendees, but may be added to the attendees field 210 of the new row later using other logic.

Stored in the confirmed field 212 is an affirmation identifier expressing the affirmative or negative response (or lack thereof) made by the user of the mobile electronic communications device 100 in message 215 when responding to the message 214. When identifying an affirmation identifier, at 232, an electronically stored affirmation lexicon 234 can be referenced to correlate phrases of the message 215 to identify affirmative and negative responses. In one embodiment, the affirmation lexicon 234 includes short or alternate forms of true and false. For example, "Yes", "OK", "That sounds great", and ":)" map to true; while "No", "Forget about it", and " . . . " map to false. Formal and informal phrases in one or more languages can make up the lexicon 234. Referencing the affirmation lexicon 234 can use techniques similar to those used for referencing the location and date-time lexicons, such as a brute-force analysis. The confirmed field 212 can have a default value, which becomes significant in the event that the user of the device 100 does not respond to the message 214 before the time stored in the date-time field 208 or the response 215 is not found to contain an affirmation identifier. In this embodiment, the default value is false for all devices 100 in the conversation. For the device 100 that added the new row 228 based on a location/time identifier found in a sent message (i.e., the meeting organizer), the confirmed field 212 toggles to true when at least one affirmation is received. For each other device 100 participating in the conversation (i.e., meeting invitees), a sent affirmation identifier from that device results in a value of true in the confirmed field 212 for that device 100.

When one or more subsequent messages are sent by the user of the device 100, in which further affirmation identifiers are found, the confirmed field 212 can be updated. For example, an invitee device 100 may initially respond with "OK" and then later send the message "On 2nd thought, no." In this case, the confirmed field 212 would begin at the default value of false, toggle to true, and then return to false. The organizer device 100 would, on the other hand, only have its confirmed field 212 toggle to false when all of the other devices 100 do not respond affirmatively. Additional or different logic for toggling values in the confirmed fields 212 of devices 100 in a conversation can be provided based on considerations such as constraints in the messaging application 106, user settings, or assumptions about user behavior.

One use of the affirmation identifier is for the device 100 to determine whether or not a notification 116 should be provided. That is, rows of the table 202 where the confirmed field 212 is false do not result in notifications 116, while rows of the table 202 where the confirmed field 212 is true result in notifications 116. In this way, unconfirmed meetings silently expire without draining power or other resources of the device 100 to issue notifications that in all likelihood will be ignored by the user.

For each message sent or received by the device 100, each of the lexicons can be consulted in the above-described manners with the aim of obtaining enough information to add a new row to the table 202. Due to the nature of human conversation, many messages in a conversation may not result in a row being added. This embodiment accounts for many scenarios. A single message may carry both a location and a time. Location and time may appear in separate messages. A first message may carry a location, several subsequent messages may have additional discussion, and finally a later message may carry a time.

Changes or updates to a row of the table 202 can be made when subsequent messages contain additional times or locations. Since the rows of the table 202 are correlated to conversations in the messaging application 106 via the unique ID stored in the ID field 204, it is known which row is to be updated by additional messages in a conversation. Referencing the example row 228, suppose the user of the device 100, "Me", after sending the confirming message 215 sends a later message containing the text "Hmm . . . how about 4?" The user's device 100 identifies the time identifier "4" and stores such until affirmation response is received from the other device 100. Until such affirmation, the existing row 228 remains unchanged. If affirmation is received, then both devices 100 update the date-time field 208 of the row 228. The changed time or location identifier can be stored in a temporary variable or in another row of the table 202 or a row of another table until the affirmation is received.

The lexicons can include expressions specific to mobile device messaging (e.g., slang or txt-speak). The lexicons can be updated from online sources, such as a remote server. The lexicons can be updated by periodic harvesting of words from the messaging application 106 or other applications or datastores. Although the lexicons have been described as separate, purpose-built lexicons, they can be of any form including a single combined lexicon or disparate lexicons primarily associated with other applications or tools, such as a spell-check tool.

Figure 3:
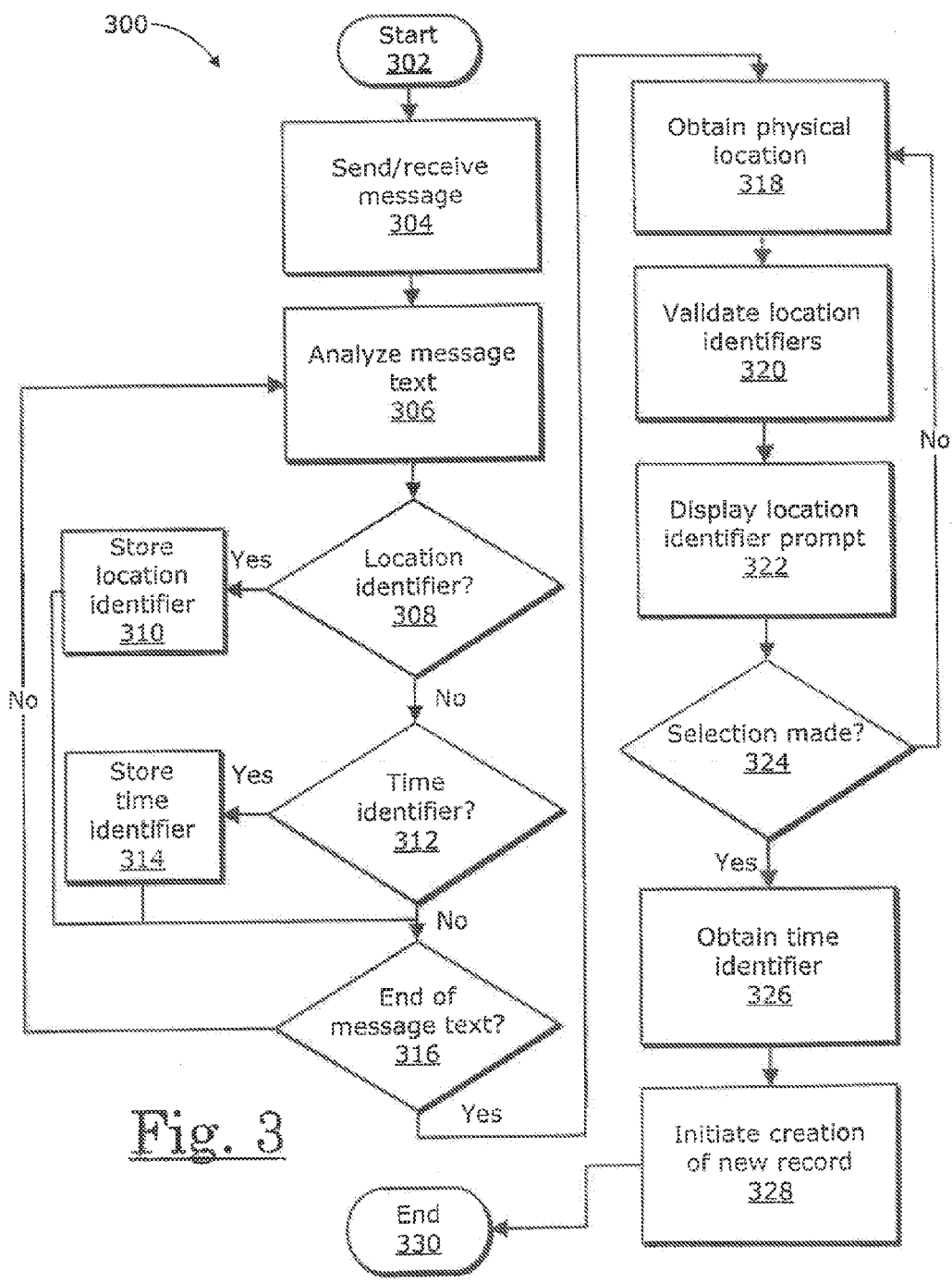
FIG. 3 is a flowchart of a method of updating a data-store associated with the mobile electronic communications device.

FIG. 3 shows a flowchart outlining a method 300 according to embodiments described herein. The method 300 can be used in conjunction with the embodiments described above or can be the basis for a distinct embodiment.

The method is initiated at 302 by a trigger such as a conversation of the messaging application 106 being activated. A conversation can be activated by, for example, a user of the device 100 opening an existing conversation or by the device 100 sending or receiving a new message.

At 304, a new message is communicated, that is, sent or received from or to the device 100. The messaging application 106 can determine whether the message is part of an existing conversation or whether the received message will trigger the creation of a new conversation.

The text of the message is then analyzed at 306 using any available textual analysis technique. In this embodiment, the text is analyzed by a brute-force technique of considering every phrase in the message, on the working assumption that words are delimited by spaces. For example, if the message is "Let's meet at 12", then every combination of adjacent words is considered as a phrase to be processed. "Let's", "Let's meet", "Let's meet at", and "at 12" are examples of the ten such phrases in this example message.

At 308, when the phrase being considered found to be a location identifier, then at 310 the location identifier is stored temporarily in memory.

At 312, when the phrase under consideration is not determined to be a location identifier, the phrase is tested to determine whether it is a time identifier. When the phrase is a time identifier, then at 314 the time identifier is stored temporarily in memory. (Note that steps 308 and 312 can be performed in any order.)

Next, at 316, the next phrase is selected until all phrases have been processed.

After the last phrase of the message text has been considered, at 318, the device 100 obtains its physical location by way of GPS or other location-obtaining technique. Estimation of physical location (or travel time) can also be performed as discussed above.

At 320, the one or more location identifiers stored at 310 are then validated. A distance between each of the physical locations represented by each location identifier and the physical location of the device is compared. When this calculation results in the distance being within a threshold distance, then the location identifier is validated. Invalid location identifiers can be safely discarded. This step can be regarded as a coarse filtering to eliminate nonsensical locations. For example, suppose the device 100 determines that its physical location is Pullman, Wash. and the threshold distance is 50 miles. A location identifier "Moscow" is found in a message and determined to have three real-world locations, namely, Moscow, Id.; Pullman-Moscow Regional Airport, WA; and Moscow, Russian Federation. Thus, the first two locations are validated based on the threshold distance, while the latter is eliminated. At this point, the stored location identifier "Moscow" can be replaced with validated location identifiers Moscow, Id. and Pullman-Moscow Regional Airport, WA. In another embodiment, the full real-world location identifiers (e.g., Moscow, Id., etc) can be stored at 310.

Next, at 322, a prompt is provided on the device 100 for the user to confirm the one location identifier or to select one of several location identifiers. When only one location identifier remains after validation at 320, then the prompt can be provided for the user to confirm the location. When several location identifiers remain, then the prompt can be provided for the user for location disambiguation. The prompt can be particularly useful when the message phrase initially found corresponds to many locations within the threshold distance. For example, the phrase "mall" may correspond to many nearby locations. The user's response to the prompt can be echoed as a message to the other devices 100 in the conversation as a confirmation (See FIG. 4c).

Whether a location is selected by the user in response to the prompt is checked at 324. The prompt can have an option that selects no location or a timer can be used to determine that a response has not been made within a threshold time. When a location is not selected or confirmed by the user, the method returns to step 318. The return to step 318 can trigger additional processing, such as re-measuring the physical location of the device 100 at 318 (i.e., perhaps the first measurement was erroneous, or the device 100 has moved significantly) or changing the threshold distance at 320 (e.g., perhaps the intended location was excluded by a too-short threshold distance).

Regardless of whether a location is determined with or without a user prompt, the user can be further prompted to store the location in a contacts or address book application or data-store for future reference.

Once a location has been selected at 324, a time identifier is obtained at 326. Obtaining the time identifier can be based on the number of time identifiers temporarily stored at 314. When one time identifier is stored at 314, obtaining the time identifier means retrieving that one time identifier from memory. When more than one time identifiers are stored at 314, obtaining the time identifier can involve additional processing (discussed later with respect to FIG. 5), a user prompt, or a combination of such. When no time identifiers are stored at 314, then obtaining the time identifier can be done by calculation (also discussed later with respect to FIG. 5).

At 328, initiation of a new data record in a data-store, such as the table 202, is performed. This step is conditional on the method 300 so far having obtained a validated location identifier and a time identifier. Should a validated location identifier or a time identifier be missing, the method 300 can be performed again for another sent or received message at 304. Repetition of the method 200 does not clear location and time identifiers previously stored at 310 and 314. For example, the method 300 may determine that a first message contains only a time identifier, which is preserved in memory while the method 300 acts on subsequent messages to find a location identifier. Or, when calculation of a time identifier is disabled, the method may determine that a first message contains only a location identifier, which is then preserved in memory while the method 300 acts on subsequent messages to find a time identifier. The method 300 also accounts for another scenario, in which many messages having many time identifiers and many location identifiers are exchanged. In this scenario, the prompt at 322 can be used to satisfy the conditional conclusion of step 328. For example, one of the participants in the conversation selects one of the many location identifiers. In addition, to account for the fact that one or more of the users of the devices 100 involved in the conversation may be moving, the method 300 measures physical locations each time a message is sent or received. Movement of a device 100 may result in a location identifier that can be used at 328 to initiate creation of the new data record.

As a result of the initiation of creation of the new data record at 328, the validated location identifier is stored in a data-store, such as the database table 202. The stored location identifier is cross-referenced to the conversation, in the event that the location identifier is to be updated by a subsequent message. This cross-reference can be archived by linking an ID of the location identifier, such as that stored the row ID field 204 of the table, to a conversation ID stored by the messaging application 106. The obtained time identifier is also stored in the data-store and cross-referenced to one or more of the validated location identifier or the conversation ID. This can be achieved by storing the time identifier in the same row as a validated location identifier when the data-store is a database table.

The method 300 then ends at 330. However, subsequent sending or receiving of messages in the conversation can cause the method 300 to be performed, with step 328 being directed to updating the existing data record corresponding to the conversation.

Figure 4A:
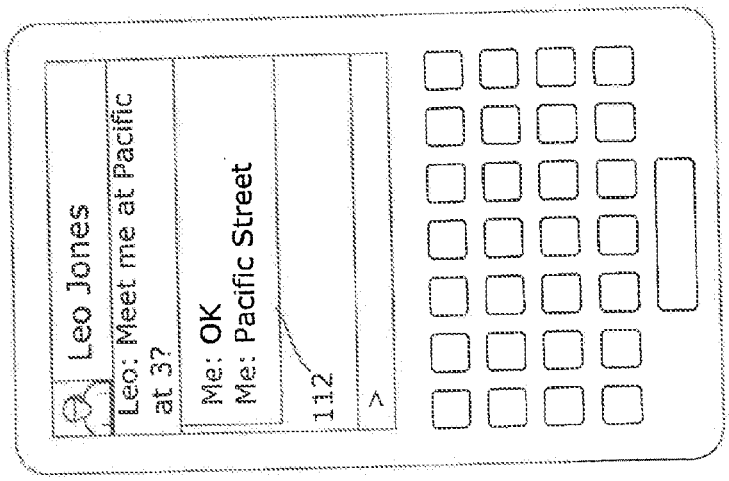
FIGS. 4a-4c are schematic diagrams of the messaging application issuing a prompt.
Figure 4B:
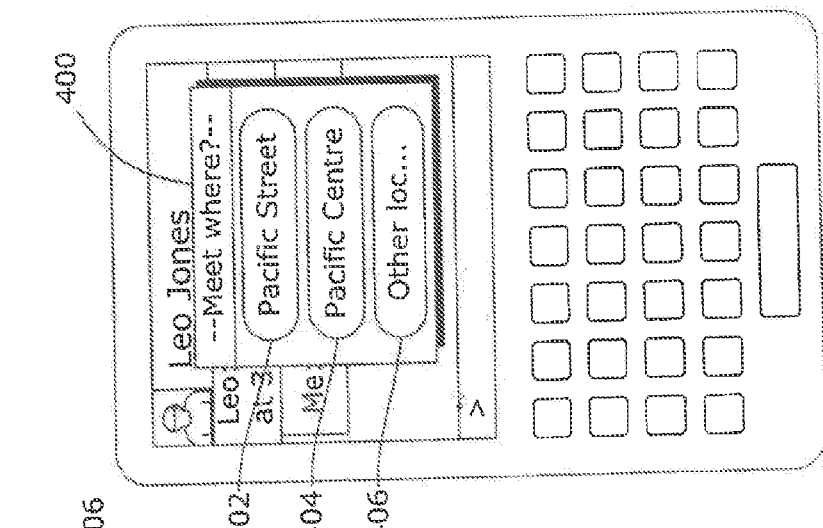
Figure 4C:
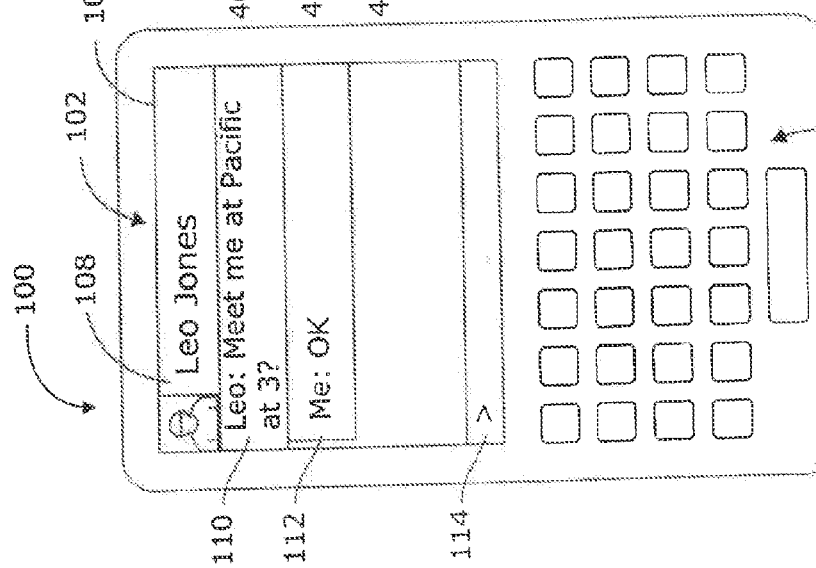

FIGS. 4a-4c show how a prompt is issued to allow a user of the device 100 to select a location corresponding to a location identifier found in message text. This prompt is an example that can be used in conjunction with any of the embodiments described herein, such as with step 322 of method 300.

FIG. 4a shows the device 100 with the messaging application 106 in a state similar to that of FIG. 1b. A message has been received from the remote correspondent. A new data record may have already been created, which would be the case would method 300 be used. The user of the device 100 has also send an affirmation message, may have toggled a confirm field value to true, depending on which of the embodiments described herein is used.

FIG. 4b shows a prompt 400 being displayed on the display 102. The prompt 400 can have qualities similar to the notification 116 (e.g., popup, audio cue, etc, as described above). The prompt 400 allows the user to identify one location corresponding to a validated location identifier. A selection element can include at least one option 402, 404 for the one or more locations and can further include an option 406 to select none of the locations. In this example, at least one location identifier for physical locations Pacific Street and Pacific Centre has been validated, resulting in options for each location being provided on buttons. A third button labeled "Other loc . . . " allows the user to reject both locations and return to the conversation to clarify the location by way of sending message.

FIG. 4c shows the prompt 400 dismissed after the user of the device 100 selects one of the locations. In this example, the user selected the location Pacific Street, and this text was then automatically echoed in the message element 112 and sent as a message to the remote user's device 100. Then, by performing the method 300 or similar method as described in another embodiment herein, the remote user's device 100 would detect the location identifier "Pacific Street" in the message, thereby potentially negating the need to issue a similar prompt on the device 100 of the remote user. Regardless of whether the message "Pacific Street" arrives in time to avoid a similar prompt on the remote user's device 100, the message serves as automatic confirmation of the location.

Figure 5:
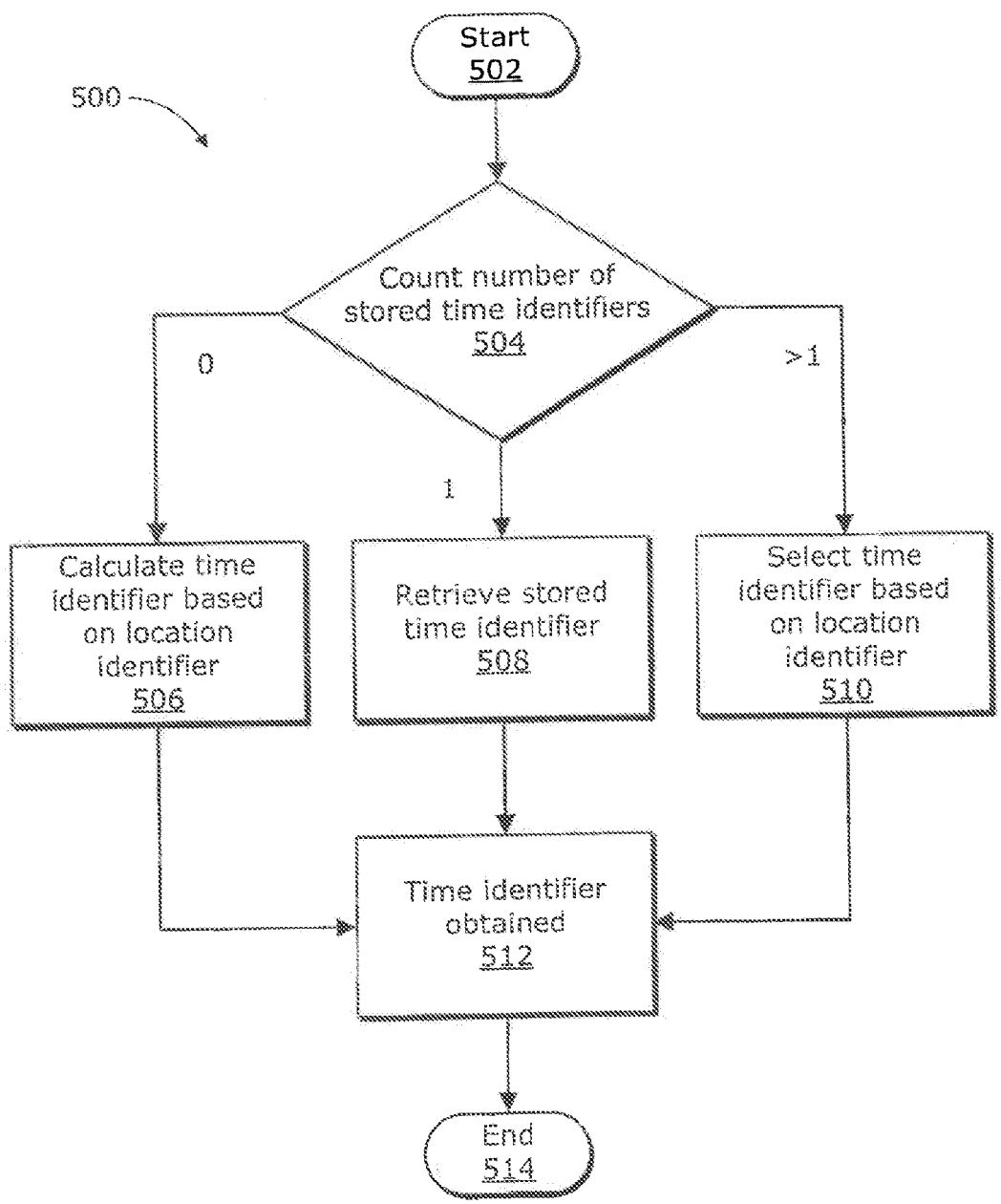
FIG. 5 is a flowchart of a method of obtaining a time identifier from any stored time identifiers.

FIG. 5 shows a flowchart of a method 500 of obtaining a time identifier from any stored time identifiers. The method 500 can be used with any of the embodiments described herein, such as at step 326 of method 300.

At 502, the method 500 is begun. This can be triggered by an event in another method.

The number of time identifiers stored in memory is then counted at 504. If none of the messages so far exchanged has been found to contain a time identifier then this count would be zero. The count would be one following the examples of FIGS. 1a-c or FIGS. 4a-c. The count would be more than one in the example of FIG. 1b, if one of the correspondents sent a later message containing the text "Hmm . . . how about 4?"

If the count of stored time identifiers is equal to zero, then a time identifier is calculated at 506. The calculation of the time identifier can include dividing the distance to the location by a rate of travel and then adding the result to the current time. For example, if walking is identified as the mode of transportation (3 km/hr), the location is kilometers away, and the current time on the device is 11 PM, then the time identifier can be calculated to be 2:20 AM (11 PM+10 km/3 km/hr). A calculated time identifier can be rounded if required.

If the count of stored time identifiers is equal to one, then at 508 the stored time identifier is simply retrieved. This can be regarded as lower error case, as exactly only one message has been found to contain a time.

If the count of stored time identifiers is greater than one, then at 510 a location identifier can be referenced to determine which time identifier to select. Each time identifier can be checked using a calculation similar to that used in step 506. The distance to the location is divided by the selected rate of travel, with the result then being added to the current time resulting in an estimated time of arrival (ETA). Each time identifier is then checked against the ETA. If only one time identifier is earlier than or equal to the ETA, then that time identifier is selected. If more than one time identifier is earlier than or equal to the ETA, then the selection can be based on predetermined logic (e.g., the soonest time identifier is selected) or a prompt can be issued to the user. If no time identifiers are earlier than or equal to the ETA, then no time identifier is obtained. In other embodiments, if no time identifiers are earlier than or equal to the ETA, then the selection can be made in the same way as when more than one time identifier is earlier than or equal to the ETA. In this way, the time identifier that is most likely correct can be automatically obtained.

Thus for the possible counts of time identifiers, one time identifier is obtained at 512.

Due to the cyclical nature of the hours of the day and days/weeks/months of the year, a single time identifier may actually correspond to an infinite number of specific times. For example, the time identifier "1" could mean 1 AM or 1 PM of each day of each year. Messages with this kind of ambiguity can be accommodated for in several ways. In one embodiment, the soonest time indicated by the time identifier is all that is considered as the time identifier, which would fall into the case of step 508. In another embodiment, the soonest and next one or more times indicated by the time identifier are considered as time identifiers, which would be handled by step 510. For example, suppose the time identifier provided at the start 502 is "1" and that the current time is 11:00 AM, Jul. 1, 2010. In the former embodiment, the counting step 504 would evaluate this time identifier as too PM, Jul. 1, 2010, which would be ultimately the obtained time identifier as 512. In the latter embodiment, with the number of time identifiers being limited to three, the counting step 504 would evaluate three separate time identifiers, namely, 1:00 PM, Jul. 1, 2010; 1:00 AM, Jul. 2, 2010; and 1:00 PM, Jul. 2, 2010. And all three of these would be analyzed at step 510. The number of time identifiers considered by the method 500 as a result of a cyclically ambiguous time identifier can be expressly limited in any implementation of the method 500. A fixed limit can be used (e.g., three) or a changeable limit can be used, such as a limit that depends on the distance to the location under consideration (i.e., for longer trips, allow for more time identifiers to be considered). Cyclic ambiguities of time can also be resolved by prompting the user of the device 100.

In another embodiment, the soonest time identifier is time to be the intended time identifier. That is, an ambiguous time identifier is taken as the nearest time (e.g., "1" would be understood as the next occurrence of 1 o'clock). An ETA is then calculated based on the rate of travel of the device 100, the current location of the device 100, and the established location identifier. When the ETA found to be after the soonest time identifier, then the ETA is suggested at a new time identifier. A prompt can be displayed to the user of the device 100 and/or the correspondent (e.g., "I can't make it by 3 PM today, how about 3:30 PM today?" The prompt can take the form of a notification, similar to the notification 116, or can be automatically echoed as a message. If the latter, then the message text analysis can be configured to take more recently found time identifiers as governing over earlier time identifiers.

Figure 6:
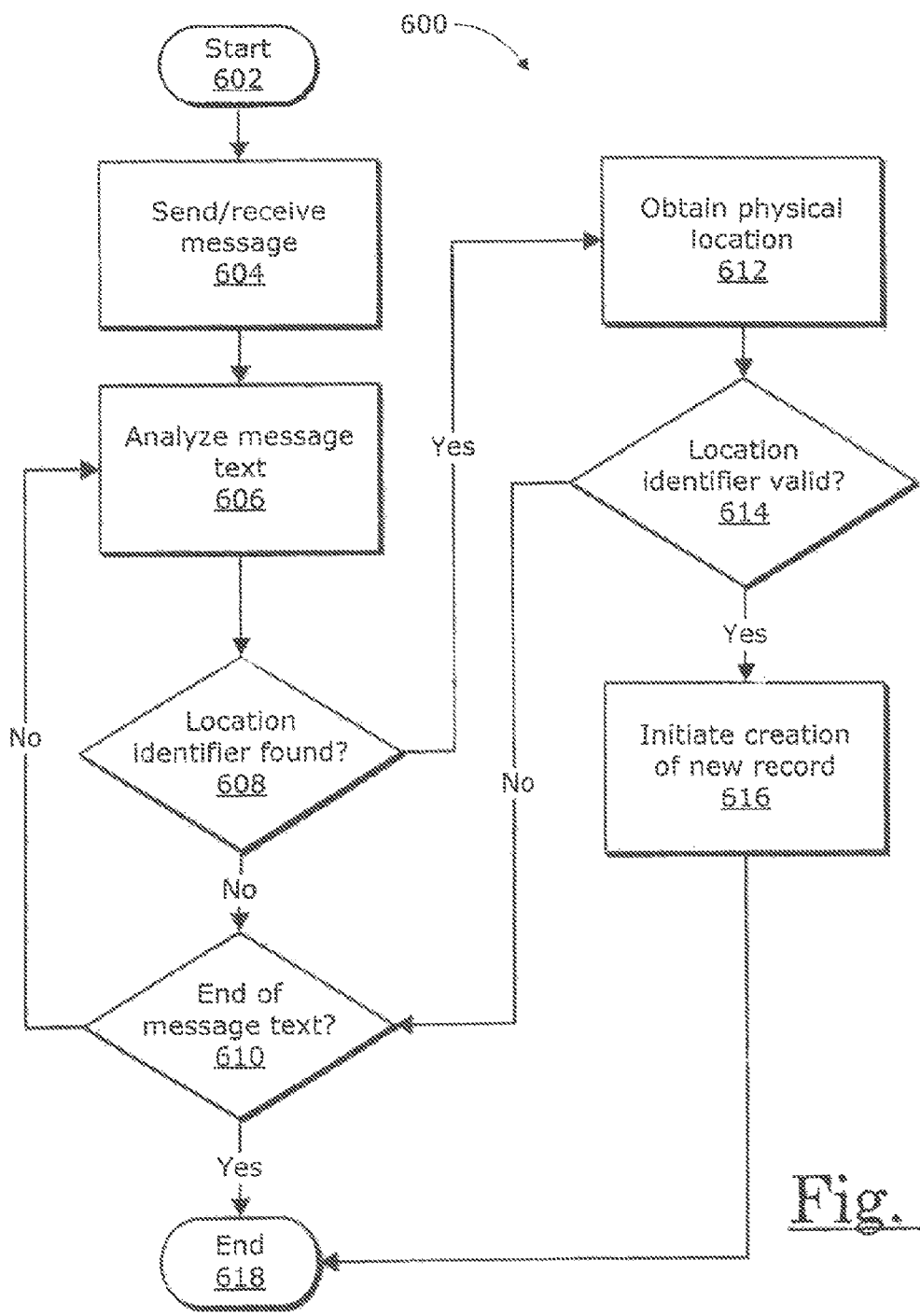
FIG. 6 is a flowchart of another method of updating a data-store associated with the mobile electronic communications device.

FIG. 6 shows a flowchart of another method 600 of updating a data-store associated with the mobile electronic communications device. In the method 600, a time identifier is not expected in message text, and may be pre-determined or unneeded. For ease of understanding, the method 600 is discussed briefly, and for additional details any of the other embodiments can be referenced.

The method is initiated at 602 by a trigger such as a conversation of the messaging application 106 being activated. A conversation can be activated by, for example, a user of the device 100 opening an existing conversation or by the device 100 sending or receiving a new message.

Then, at 604, a message communicated at the messaging application 106.

At 606, message text is analyzed using brute-force or another method. Until a location identifier is found at 608, the method checks for more message text to analyze at 610.

At 612, after a location identifier is identified in the message text, the device 100 obtains its physical location. The location identifier undergoes validation by way of a threshold distance, at 614. If the location identifier represents a location too far from the device 100, the location identifier is discarded and more message text is analyzed at 610.

If the location identifier is validated at 614 (i.e., the location is within a travel range of the device 100), then creation of a new data record is initiated at 616. A default or calculated time identifier can be included in the data record at this time, or can be entered by the user now or at a later time.

FIGS. 7*a*-*b* show schematic diagrams of the mobile electronic communications device 100 providing selection and confirmation of an event represented by a data record. The features and aspects of this embodiment can be used with the other embodiments described herein. Only features and aspects differing from the other embodiments are described in detail.

As shown in FIG. 7*a*, a message is received at the device 100 and displayed in the message element 110, though the message could also have been sent from the device 100. A location identifier is detected and automatically highlighted in the displayed message text at 700. In this example, the highlighting is by way of a double underline, though any kind of highlighting, such as coloring, bolding, hyperlinking, etc is possible. The location identifier 700 is selectable by way of a touch-screen interface, a two-dimensional navigation device (e.g., a track pad or track ball), a keyboard, a menu, or the like.

The highlighted location identifier 700 is a kind of prompt that can be used in addition to or instead of any of the other prompts described herein. Multiple highlighted location identifiers 700 within one or more messages provide for user disambiguation.

When the location identifier 700 is selected, an interface 702 is displayed as shown in FIG. 7*b*. The interface 702 can be provided by the messaging application 106, or provided by another application, such as a calendaring or reminder application. The interface 702 includes an attendees display element 704, a location display element 706, and a time display element 708, along with corresponding modification input elements 710, 712, 714. An affirmation input element 716 and a cancel input element 718 are also provided.

The attendees display element 704 lists the attendees of the data record. In this example, the user of the device 100 and the remote correspondent are automatically obtained from the conversation and listed here. The modification input element 710 allows the user to modify the attendees. In this embodiment, the modification input element 710 activates a contacts application to add or delete attendees from the data record.

The location display element 706 shows a location corresponding to the highlighted location identifier 700 as determined by one of methods described herein. For example, if more than one location matches the location identifier 700, then the location displayed in the element 706 can be the nearest location. The modification input element 712 allows the user to select another location that matches the location identifier 700 or even select a non-matching location. In one embodiment, the modification input element 712 activates a mapping application to facilitate a user selection.

The time display element 708 shows a time identifier obtained from a message, or provided as a default, or calculated, etc as described elsewhere herein. The modification input elements 714 allows the user to select a different time, or in another embodiment activate the clock application to facilitate a user selection.

Selection of the affirmation input element 716 initiates creation of the data record based on the values shown in the elements 704, 706, 708 as described elsewhere herein. Selection of the affirmation input element 716 can echo to the correspondent a message containing the values shown in the elements 704, 706, 708 as a notification of any changes made in the interface 702. In another embodiment, selection of the affirmation input element 716 sends initiates creation of the data record on correspondent's device 100, including any changes made in the interface 702.

In one embodiment, the location identifier 700 is first validated before being highlighted. That is, validation is a condition of highlighting location identifiers. In another embodiment, validation only occurs after a location identifier is selected.

Selection of the cancel input element 718 causes initiation of creation of the data record to not occur. In this embodiment, selection of the cancel input element 718 causes the device 100 to return to the state shown in FIG. 7a.

In other embodiments, such as those described elsewhere herein, the interface 702 can be provided to view or modify a data record.

FIGS. 7c-d show schematic diagrams of the mobile electronic communications device 100 providing information associated with a location. The features and aspects of this embodiment can be used with the other embodiments described herein. Only features and aspects differing from the other embodiments are described in detail.

As shown in FIG. 7c, information associated with the location identifier 700 can be displayed when, for example, the user of the device 100 "hovers" a cursor or finger 720 over the location identifier 700. "Hovering" can include touching a touch-screen with a finger or stylus, using a two-dimensional navigation device to position a cursor in a substantially stationary manner, or the like. In response to the hovering, a balloon element 722 can be displayed to show the user of the device 100 that the location identifier 700 corresponds to a physical location called "Pacific Centre" having a particular address. Highlighting the location identifier 700 can indicate to the user that that further information about the location identifier is available, should the user hover or otherwise interact with the location identifier 700. Highlighting the location identifier 700 can also serve to inform the user of the device 100 that the location identifier 700 is editable.

FIG. 7d shows an interface 724 for viewing or modifying a data record associated with the location identifier 700. The interface 724 can be part of a contacts or address book application, the messaging application 106, or another application. Data records associated with location identifiers can be stored in the data-store of any of these applications or in a separate user location data-store (see FIG. 11).

The interface 724 includes a location name element 726, a location smart names element 728, and a location address element 730. The elements 726-730 are associated with a data record underlying the location identifier 700. Such data records can include fields directly mapped to the elements 726-730, as well as other fields such as a record ID. The location name element 726 includes the name of the physical location. The smart names element 728 includes one or more phrases, in addition to or instead of the name stored in 726, that the messaging application 106 can reference to detect the location identifier 700 within messages. The address element 730 includes the physical address of the location identifier 700, which is used in location identifier validation and other processes described herein. An edit input element 732 allows the user of the device 100 to edit the contents of the elements 726-730.

The interface 724 and underlying location identifier data records can be used, for example, in situations where a location identifier is to be created or customized by the user of the device 100. For example, a location named "home" can be created and then associated with smart names "home", "my place", and "the house", as well as a particular physical address. The location identifier "home" can then be detected in messages and the related physical location used in location identifier validation. For example, upon detecting the text "my place" in a message, the messaging application 106 can validate "my place" as the location "home" or as a restaurant of the same name, depending on the measured physical location of the device 100. In this way, the location identifier data records act as user-customizable lexicon, and therefore can be used in the same manner as the other lexicons described herein.

FIG. 8a shows a schematic diagram of the mobile electronic communications device 100 showing a notification 800 providing options for directions and editing. Only features and aspects differing from other notifications described herein (e.g., notification 116) are described in detail. The features and aspects of this embodiment can be used with the other embodiments described herein. For example, the notification 800 can be used instead of the notification 116. As well, options from each notification 116, 800 can be combined in other notifications.

The notification 800 includes notification text 802 describing a data record. In this example, the text 802 includes a suggestion to the user, that is "Leave now," as well as details of the event, namely the location and time. The notification also includes an option to dismiss 804 the notification and an option to view or edit 806 the data record. Selecting the option 806 can initiate display of the interface 702 of FIG. 7b to view or edit the data record. Further, the notification 800 can include an option to provide directions 808 to the location stored in the data record. For example, selecting the option 808 can cause the location stored in the location field 206 (see FIG. 2) of the data record to be passed to a mapping application as a destination.

FIG. 8a also illustrates that the notification can be provided to the user at a time dependent on the travel time to the location stored in the location field 206 of the data record. Examples of determining travel times and ETAs are described elsewhere herein, and a suitable reminder time can be determined based on such and stored in a reminder date-time field 810 of the table 202, as shown in FIG. 8b (with other fields omitted for clarity as signified by ellipses). In this example, the reminder time was determined to be 2:50 PM based on a calculated travel time of the device 100 to the location stored in the location field 206 (see FIG. 2). In addition, the reminder time can be automatically updated in the data-store to reflect movement of the device 100, so that if the device 100 nears or moves away from the location, the reminder time is shortened or lengthen respectively. The reminder time can be stored as a duration ahead of the date-time stored in the data record (e.g., 50 minutes), as a full date-time (e.g., May 14, 2010 2:10 PM), or similar.

FIG. 9a shows a schematic diagram of the mobile electronic communications device 100 showing a showing a message containing a contact name. Only features and aspects differing from other embodiments described herein are described in detail. Features and aspects of this embodiment can be used with the other embodiments.

A message is received at the device 100 and displayed in a message element 900, though the message could also have been sent from the device 100. The message text is analyzed as described in the other embodiments. However, a contact name lexicon is additionally referenced. The contact name lexicon can include names from a contacts application or data-store, an address book application or data-store, or another application or data-store. When an attendee identifier is found in the message the corresponding data record is created or updated to contain a reference to the associated person. In the example shown, the attendee identifier "Astrid" is identified in the message based on a brute-force phrase-by-phrase comparison of the message text with names stored in the device's contact data-store. As a result, the complete attendee identifier "Astrid Koda" is stored in the attendees field 210 of the table 202, as shown in FIG. 9b. When a notification is issued for the data record (e.g., notifications 116, 800) or when a view/edit interface is displayed (e.g., interface 702), the attendee identifier "Astrid Koda" can be shown and acted upon.

FIG. 9c shown how the attendees field 210 of the table 202 can be modified to accommodate a name that is found in the contact name lexicon but not found in a contacts or address book application or data-store. Suppose the contact name lexicon includes a list of common names as well as specific names of a user's contacts stored on the device 100. When a message phrase matches a common name but not the name of a specific contact, that is, the name is unassociated, the name can be stored in the attendees field 210 as indicated in FIG. 9c. In the example shown, the name "Astrid" in quotation marks is stored as an attendee identifier in the attendees field 210, the quotation marks signifying that no contact exists on the device 100. Thus, when a notification is issued for the data record (e.g., notifications 116, 800) or when a view/edit interface is displayed (e.g., interface 702), the unassociated text "Astrid" can be shown and acted upon.

In another embodiment, when a phrase is identified as an unassociated name, a prompt can be displayed to associate the name with a contact or create a new contact within a contacts or address book application or data-store.

FIG. 10a shows a schematic diagram of the table 202 modified to accommodate a duration field 1000 for conflict checking. FIGS. 10b-c are schematic diagrams of the messaging application 106 of the mobile electronic communications device 100 showing automatic conflict avoidance messages. The device 100 is omitted from illustration for clarity. Only features and aspects differing from other embodiments described herein are described in detail. Features and aspects of this embodiment can be used with the other embodiments.

The table 202 includes the data record 228 described previously, as well as a duration field 1000 storing a duration identifier for the event represented by the data record 228. The duration identifier can be obtained from message text by applying a method and lexicon similar to those for location and time described elsewhere herein. In another embodiment, the duration identifier can be obtained by providing a prompt or interface (such as the interface 702) to the user of the device 100. In another embodiment, the duration identifier can be set to a default value.

Referring to FIG. 10b, a correspondent identification element 108 includes a photo and name of a correspondent, whom in this example is Astrid Koda. A message element 110 includes received message text that is analyzed by one of the methods described herein. In this example, the message text analysis would result in the initiation of creation of a data record. However, before this data record is created, the table 202 is checked for conflicts, which results in a determination of conflict between the to-be-created event and the existing event represented by the data record 228. In short, creation of the data record based on the message from Astrid Koda will result in one of the data records being redundant, since the user of the device 100 cannot attend the established event from 3:00-4:00 PM as well as an event being proposed for 3:30 PM.

In this embodiment, established data records take precedence over pending data records. As such, the messaging application 106 can be configured to automatically generate and echo a reply, as shown in the message element 112. The reply is based on the existing record 228 and serves to notify the correspondent as well as the user of the device 100 of the conflict and of the fact that the proposed data record was not created.

In another embodiment, as shown in FIG. 10c, an affirmation identifier is required to be detected before the automatic reply is made. This affords the user of the device 100 the opportunity to make the automatic reply unnecessary, if, for example, the user responds with "No" or other negative identifier or responds with a different, non-conflicting time. In the example shown, the user of the device 100 sends a message with a positive affirmation identifier, which triggers the follow-on automatic response indicating the conflict.

Figure 11:
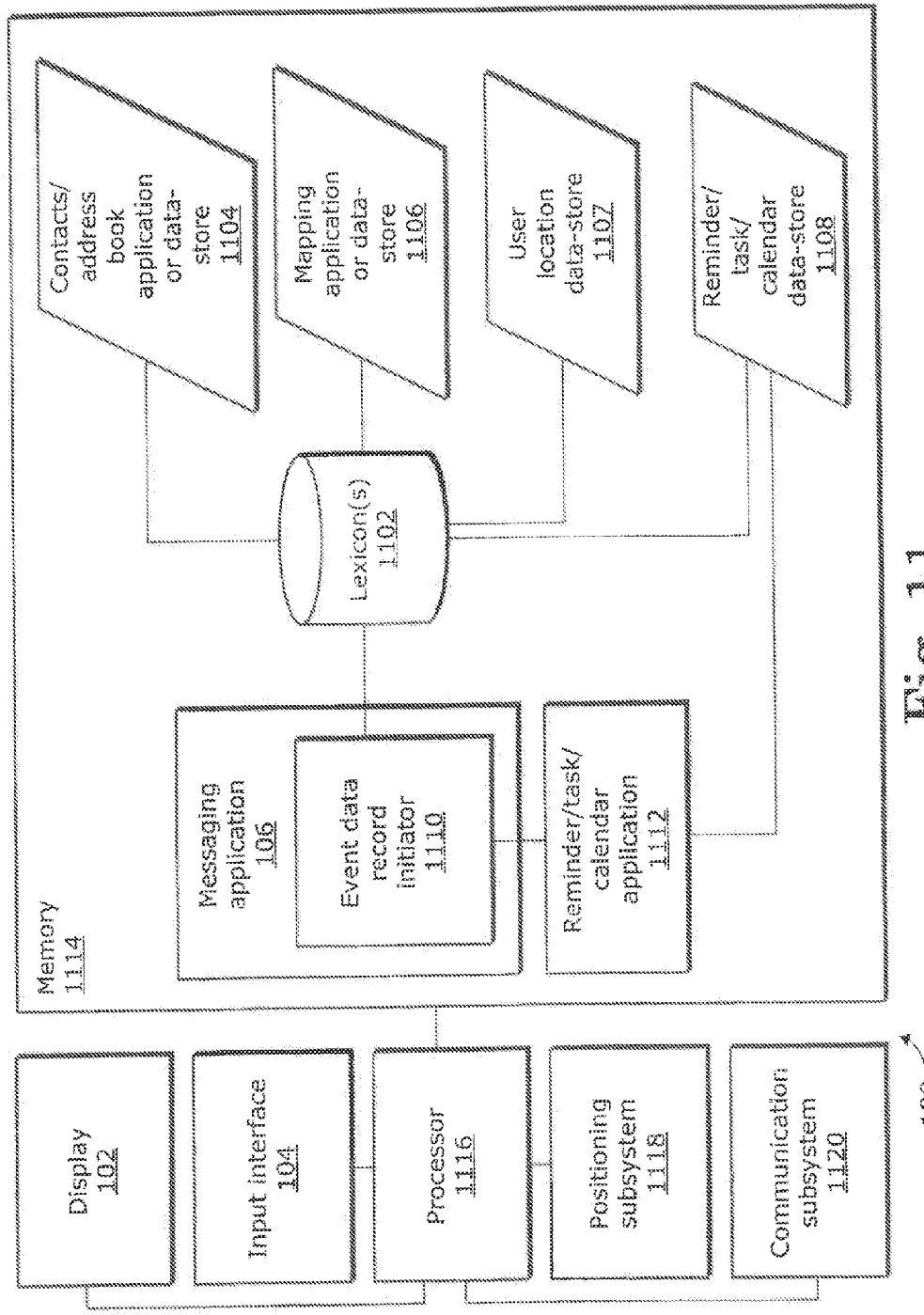
FIG. 11 is a block diagram of selected components of the mobile electronic communications device.

FIG. 11 shows a block diagram of selected components of the mobile electronic communications device 100. Portions of the device 100 are omitted from this figure for the sake of clarity.

The device 100 includes one or more electronically stored lexicons 1102 storing at least location identifiers as well as any of time identifiers, affirmation identifiers, attendee identifiers, and duration identifiers. In this embodiment, the lexicon 1102 is periodically updated from one or more data-stores, which can include a contacts or address book application or data-store 1104; a mapping application or data-store 1106; a user location data-store 1107 (e.g., see FIG. 7d and related description); a reminder, task, or calendar data-store 1108; or any combination of such. The data-stores may be on the device 100 or remote from the device 100, such as being on a server. In another embodiment, the lexicon 1102 is not updated. The lexicon 1102 can also be user editable or customizable.

In some embodiments, conversations conducted with the messaging application 106 can be parsed to populate or update a data-store, such as the user location data-store 1107. For example, the messaging application 106 can parse conversation logs and automatically create custom locations for potentially ambiguous location identifiers, such as "mall". Such parsing can alternatively be done while a conversation is underway. Potentially ambiguous location identifiers can then be associated with physical locations that the participants in the conversation resolve during the conversation. Thus, the next time that the messaging application 106 encounters the location identifier, the previously resolved physical location will be used during location validation. This kind of custom location identifier can also be associated with specific conversation participants, by way of an associated-persons field (in addition to the fields discussed with respect to FIG. 7d), so that ambiguities can be resolved differently for conversations with different people. Continuing the above example, the phrase "mall" can be a smart name for several locations. During a conversation, one or more of these locations can be chosen for location validation based on a comparison of the conversation participants with those stored in the associated-persons field. If a user prompt is needed during validation, several of such locations can be displayed in a prioritized listing.

An event data record initiator 1110 of the messaging application 106, or alternatively of another application or as a standalone application, compares message text of the messaging application 106 to the lexicon 1102 using any of the methods described elsewhere herein. The event data record initiator 1110 can be implemented in hardware, software, or a combination of such. In this embodiment, the event data record initiator 1110 is a software object of the messaging application 106, such as a subroutine, class, module, or the like.

In this embodiment, the event data record initiator 1110 initiates creation of data records via a reminder, task, or calendar application 1112. The event data record initiator 1110 can do this using any application interface technique, such as using an application programming interface (API), using inter-application messaging, etc. In another embodiment, the event data record initiator 1110 interacts directly with the data-store 1108.

In this embodiment, the messaging application 106 and messages of same, event data record initiator 1110, applications or data-stores 1104, 1106, 1107, 1108, and 1112, and lexicon 1102 are stored in memory 1114. The memory 1114 is accessible to a processor 1116 which can run or execute applications, including the applications shown and those not shown, such as an operating system, phone application, etc. Further provided is a positioning subsystem 1118, such as a GPS system, for providing the physical location of the device 100 to the event data record initiator 1110. A communication subsystem 1120 is also provided for wirelessly communicating electronic messages with another device 100. The processor 1116 is coupled to and can coordinate the functions of the display 102, input interface 104, memory 1114, positioning subsystem 1118, and communication subsystem 1120. The processor 1116 can be configured as such by executable program code, for example, which can be stored in the memory 1114 or in another non-transitory computer-readable medium, such as a removable storage device or the like. For example, the processor 1116 can control or otherwise cause the positioning subsystem 1118 to measure the physical location of the device 100 in response to a request by the event data record initiator 1110, as well as provide the measured location to the event data record initiator 1110.

It is an advantage of the above-described embodiments that a data record is created in a data-store after a location identifier has been verified. This can reduce the chance that the data record is erroneous, which aside from the introduction of human error, can require resources (e.g., power and communications bandwidth) to correct. In addition, the location measurement is taken after a location identifier is found in a message, thus saving further resources by taking such measurements when needed as opposed to, say, periodically taking location measurements. Obtaining a time identifier, an affirmation identifier, an attendee identifier, or a duration identifier further reduces the chance of an erroneous data record. Thus, the above-described embodiments are highly usable and convenient, while at the same time reduce the chance of error and the demand on resources.

Figure 12:
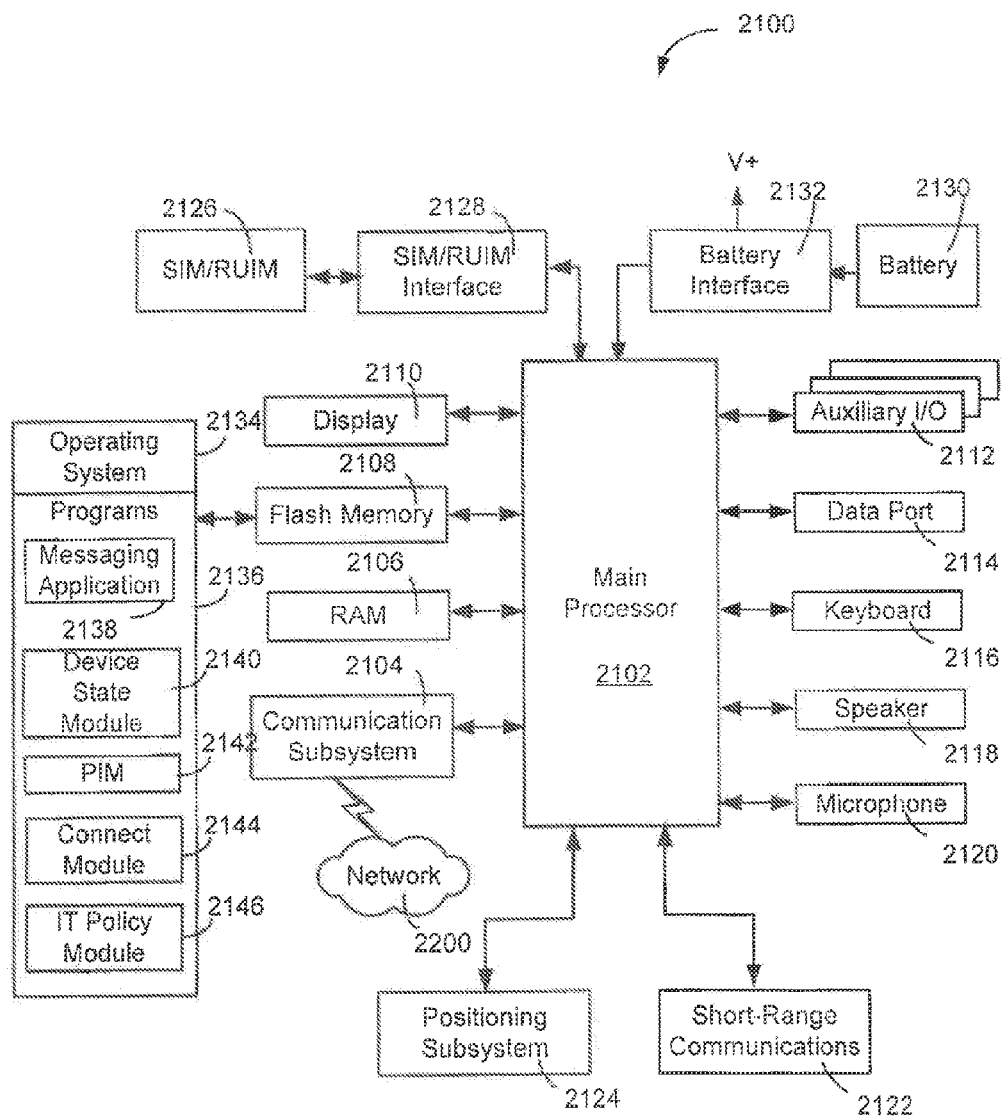
FIG. 12 is a block diagram of another embodiment of a mobile electronic communications device.

Referring first to FIG. 12, shown therein is a block diagram of an example embodiment of a mobile device 2100. The mobile device 2100 is similar to the device 100 described above in that the methods and embodiments described above can also be implemented on the device 2100. The mobile device 2100 includes a number of components such as a main processor 2102 that controls the overall operation of the mobile device 2100. Communication functions, including data and voice communications, are performed through a communication subsystem 2104. The communication subsystem 2104 receives messages from and sends messages to a wireless network 2200. In this example embodiment of the mobile device 2100, the communication subsystem 2104 is configured in accordance with the Global System for Mobile Communication (GSM) and General Packet Radio Services (GPRS) standards.

The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 2104 with the wireless network 2200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 2200 associated with mobile device 2100 is a GSM/GPRS wireless network in one example implementation, other wireless networks may also be associated with the mobile device 2100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA 2000 networks, GSM/GPRS networks (as mentioned above), and future third-generation (3G) networks like EDGE and UMTS. Some other examples of data-centric networks include WiFi 802.211, Mobitex™ and DataTAC™ network communication systems. Examples of other voice-centric data networks include Personal Communication Systems (PCS) networks like GSM and Time Division Multiple Access (TDMA) systems.

The main processor 2102 also interacts with additional subsystems such as a Random Access Memory (RAM) 2106, a flash memory 2108, a display 2110, an auxiliary input/output (I/O) subsystem 2112, a data port 2114, a keyboard 2116 or other input interface (e.g., see input interface 104), a speaker 2118, a microphone 2120, short-range communications 2122 and a positioning subsystem 2124 (such as a GPS subsystem).

Some of the subsystems of the mobile device 2100 perform communication-related functions, whereas other subsystems may provide "resident" or on-device functions. By way of example, the display 2110 and the keyboard 2116 may be used for both communication-related functions, such as entering a text message for transmission over the network 2200, and device-resident functions such as a calculator or task list.

The mobile device 2100 can send and receive communication signals over the wireless network 2200 after required network registration or activation procedures have been completed. Network access is associated with a subscriber or user of the mobile device 2100. To identify a subscriber, the mobile device 2100 requires a SIM/RUIM card 2126 (i.e., Subscriber Identity Module or a Removable User Identity Module) to be inserted into a SIM/RUIM interface 2128 in order to communicate with a network. The SIM card or RUIM 2126 is one type of a conventional "smart card" that can be used to identify a subscriber of the mobile device 2100 and to personalize the mobile device 2100, among other things. Without the SIM card 2126, the mobile device 2100 is not fully operational for communication with the wireless network 2200. By inserting the SIM card/RUIM 2126 into the SIM/RUIM interface 2128, a subscriber can access all subscribed services. Services may include: web browsing and messaging such as e-mail, voice mail, SMS, and MMS. More advanced services may include: point of sale, field service and sales force automation. The SIM card/RUIM 2126 includes a processor and memory for storing information. Once the SIM card/RUIM 2126 is inserted into the SIM/RUIM interface 2128, it is coupled to the main processor 2102. In order to identify the subscriber, the SIM card/RUIM 2126 can include some user parameters such as an International Mobile Subscriber Identity (IMSI). An advantage of using the SIM card/RUIM 2126 is that a subscriber is not necessarily bound by any single physical mobile device. The SIM card/RUIM 2126 may store additional subscriber information for a mobile device as well, including datebook (or calendar) information and recent call information. Alternatively, user identification information can also be programmed into the flash memory 2108.

The mobile device 2100 is a battery-powered device and includes a battery interface 2132 for receiving one or more rechargeable batteries 2130. In at least some embodiments, the battery 2130 can be a smart battery with an embedded microprocessor. The battery interface 2132 is coupled to a regulator (not shown), which assists the battery 2130 in providing power V+ to the mobile device 2100. Although current technology makes use of a battery, future technologies such as micro fuel cells may provide the power to the mobile device 2100.

The mobile device 2100 also includes an operating system 2134 and software components 2136 to 2146 which are described in more detail below. The operating system 2134 and the software components 2136 to 2146 that are executed by the main processor 2102 are typically stored in a persistent store such as the flash memory 2108, which may alternatively be a read-only memory (ROM) or similar storage element (not shown). Those skilled in the art will appreciate that portions of the operating system 2134 and the software components 2136 to 2146, such as specific device applications, or parts thereof, may be temporarily loaded into a volatile store such as the RAM 2106. Other software components can also be included, as is well known to those skilled in the art.

The subset of software applications 2136 that control basic device operations, including data and voice communication applications, will normally be installed on the mobile device 2100 during its manufacture. Other software applications include a messaging application 2138 that can be any suitable software program that allows a user of the mobile device 2100 to send and receive electronic messages. Various alternatives exist for the messaging application 2138 as is well known to those skilled in the art. Messages that have been sent or received by the user are typically stored in the flash memory 2108 of the mobile device 2100 or some other suitable storage element in the mobile device 2100. In at least some embodiments, some of the sent and received messages may be stored remotely from the device 2100 such as in a data store of an associated host system that the mobile device 2100 communicates with. The messaging application 2138 embodies the same features described herein for the messaging application 106.

The software applications can further include a device state module 2140, a Personal Information Manager (PIM) 2142, and other suitable modules (not shown). The device state module 2140 provides persistence, i.e., the device state module 2140 ensures that important device data is stored in persistent memory, such as the flash memory 2108, so that the data is not lost when the mobile device 2100 is turned off or loses power.

The PIM 2142 includes functionality for organizing and managing data items of interest to the user, such as, but not limited to, e-mail, contacts, calendar events, voice mails, appointments, and task items. A PIM application has the ability to send and receive data items via the wireless network 2200. PIM data items may be seamlessly integrated, synchronized, and updated via the wireless network 2200 with the mobile device subscriber's corresponding data items stored and/or associated with a host computer system. This functionality creates a mirrored host computer on the mobile device 2100 with respect to such items. This can be particularly advantageous when the host computer system is the mobile device subscriber's office computer system.

The mobile device 2100 also includes a connect module 2144, and an IT policy module 2146. The connect module 2144 implements the communication protocols that are required for the mobile device 2100 to communicate with the wireless infrastructure and any host system, such as an enterprise system, that the mobile device 2100 is authorized to interface with. Examples of a wireless infrastructure and an enterprise system are given in FIGS. 14 and 15, which are described in more detail below.

The connect module 2144 includes a set of APIs that can be integrated with the mobile device 2100 to allow the mobile device 2100 to use any number of services associated with the enterprise system. The connect module 2144 allows the mobile device 2100 to establish an end-to-end secure, authenticated communication pipe with the host system. A subset of applications for which access is provided by the connect module 2144 can be used to pass IT policy commands from the host system to the mobile device 2100. This can be done in a wireless or wired manner. These instructions can then be passed to the IT policy module 2146 to modify the configuration of the device 2100. Alternatively, in some cases, the IT policy update can also be done over a wired connection.

The IT policy module 2146 receives IT policy data that encodes the IT policy. The IT policy module 2146 then ensures that the IT policy data is authenticated by the mobile device 2100. The IT policy data can then be stored in the flash memory 2106 in its native form. After the IT policy data is stored, a global notification can be sent by the IT policy module 2146 to all of the applications residing on the mobile device 2100. Applications for which the IT policy may be applicable then respond by reading the IT policy data to look for IT policy rules that are applicable.

The IT policy module 2146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 2146 can determine which applications are affected by the IT policy data and send a notification to only those applications. In either of these cases, for applications that aren't running at the time of the notification, the applications can call the parser or the IT policy module 2146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 2146 sends an acknowledgement back to the host system to indicate that the IT policy data was received and successfully applied.

Other types of software applications can also be installed on the mobile device 2100. These software applications can be third party applications, which are added after the manufacture of the mobile device 2100. Examples of third party applications include games, calculators, utilities, etc.

The additional applications can be loaded onto the mobile device 2100 through at least one of the wireless network 2200, the auxiliary I/O subsystem 2112, the data port 2114, or the short-range communications subsystem 2122. This flexibility in application installation increases the functionality of the mobile device 2100 and may provide enhanced on-device functions, communication-related functions, or both. For example, secure communication applications may enable electronic commerce functions and other such financial transactions to be performed using the mobile device 2100.

The data port 2114 enables a subscriber to set preferences through an external device or software application and extends the capabilities of the mobile device 2100 by providing for information or software downloads to the mobile device 2100 other than through a wireless communication network. The alternate download path may, for example, be used to load an encryption key onto the mobile device 2100 through a direct and thus reliable and trusted connection to provide secure device communication.

The data port 2114 can be any suitable port that enables data communication between the mobile device 2100 and another computing device. The data port 2114 can be a serial or a parallel port. In some instances, the data port 2114 can be a USB port that includes data lines for data transfer and a supply line that can provide a charging current to charge the battery 2130 of the mobile device 2100.

The short-range communications subsystem 2122 provides for communication between the mobile device 2100 and different systems or devices, without the use of the wireless network 2200. For example, the subsystem 2122 may include an infrared device and associated circuits and components for short-range communication. Examples of short-range communication standards include standards developed by the Infrared Data Association (IrDA), Bluetooth, and the 802.211 family of standards developed by IEEE.

In use, a received signal such as a text message, an e-mail message, or web page download will be processed by the communication subsystem 2104 and input to the main processor 2102. The main processor 2102 will then process the received signal for output to the display 2110 or alternatively to the auxiliary I/O subsystem 2112. A subscriber may also compose data items, such as e-mail messages, for example, using the keyboard 2116 in conjunction with the display 2110 and possibly the auxiliary I/O subsystem 2112. The auxiliary subsystem 2112 may include devices such as: a touch screen, mouse, track ball, infrared fingerprint detector, or a roller wheel with dynamic button pressing capability. The keyboard 2116 can be an alphanumeric keyboard and/or telephone-type keypad. However, other types of keyboards may also be used. A composed item may be transmitted over the wireless network 2200 through the communication subsystem 2104.

For voice communications, the overall operation of the mobile device 2100 is substantially similar, except that the received signals are output to the speaker 2118, and signals for transmission are generated by the microphone 2120. Alternative voice or audio I/O subsystems, such as a voice message recording subsystem, can also be implemented on the mobile device 2100. Although voice or audio signal output is accomplished primarily through the speaker 2118, the display 2110 can also be used to provide additional information such as the identity of a calling party, duration of a voice call, or other voice call related information.

Figure 13:
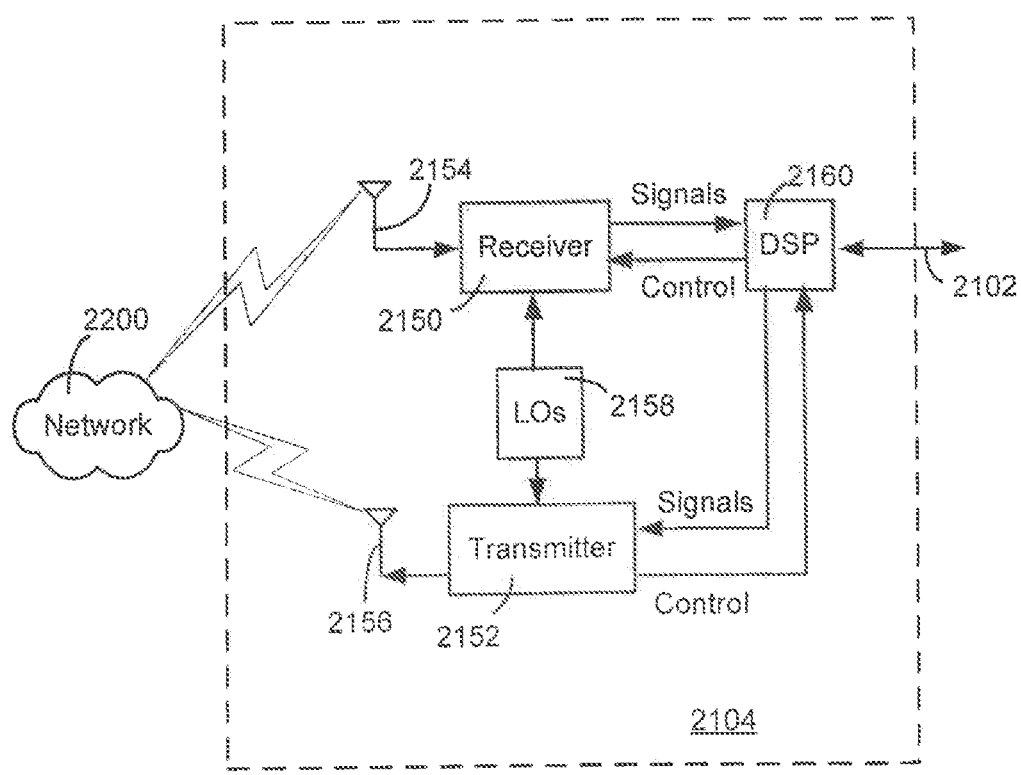
FIG. 13 is a block diagram of an example embodiment of a communication subsystem component of the mobile device of FIG. 12.

Referring now to FIG. 13, an example block diagram of the communication subsystem component 2104 is shown. The communication subsystem 2104 includes a receiver 2150, a transmitter 2152, as well as associated components such as one or more embedded or internal antenna elements 2154 and 2156, Local Oscillators (LOs) 2158, and a processing module such as a Digital Signal Processor (DSP) 2160. The particular design of the communication subsystem 2104 is dependent upon the communication network 2200 with which the mobile device 2100 is intended to operate. Thus, it should be understood that the design illustrated in FIG. 13 serves only as one example.

Signals received by the antenna 2154 through the wireless network 2200 are input to the receiver 2150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 2160. In a similar manner, signals to be transmitted are processed, including modulation and encoding, by the DSP 2160. These DSP-processed signals are input to the transmitter 2152 for digital-to-analog (D/A) conversion, frequency up conversion, filtering, amplification and transmission over the wireless network 2200 via the antenna 2156. The DSP 2160 not only processes communication signals, but also provides for receiver and transmitter control. For example, the gains applied to communication signals in the receiver 2150 and the transmitter 2152 may be adaptively controlled through automatic gain control algorithms implemented in the DSP 2160.

The wireless link between the mobile device 2100 and the wireless network 2200 can contain one or more different channels, typically different RF channels, and associated protocols used between the mobile device 2100 and the wireless network 2200. An RF channel is a limited resource that must be conserved, typically due to limits in overall bandwidth and limited battery power of the mobile device 2100.

When the mobile device 2100 is fully operational, the transmitter 2152 is typically keyed or turned on only when it is transmitting to the wireless network 2200 and is otherwise turned off to conserve resources. Similarly, the receiver 2150 is periodically turned off to conserve power until it is needed to receive signals or information (if at all) during designated time periods.

Figure 14:
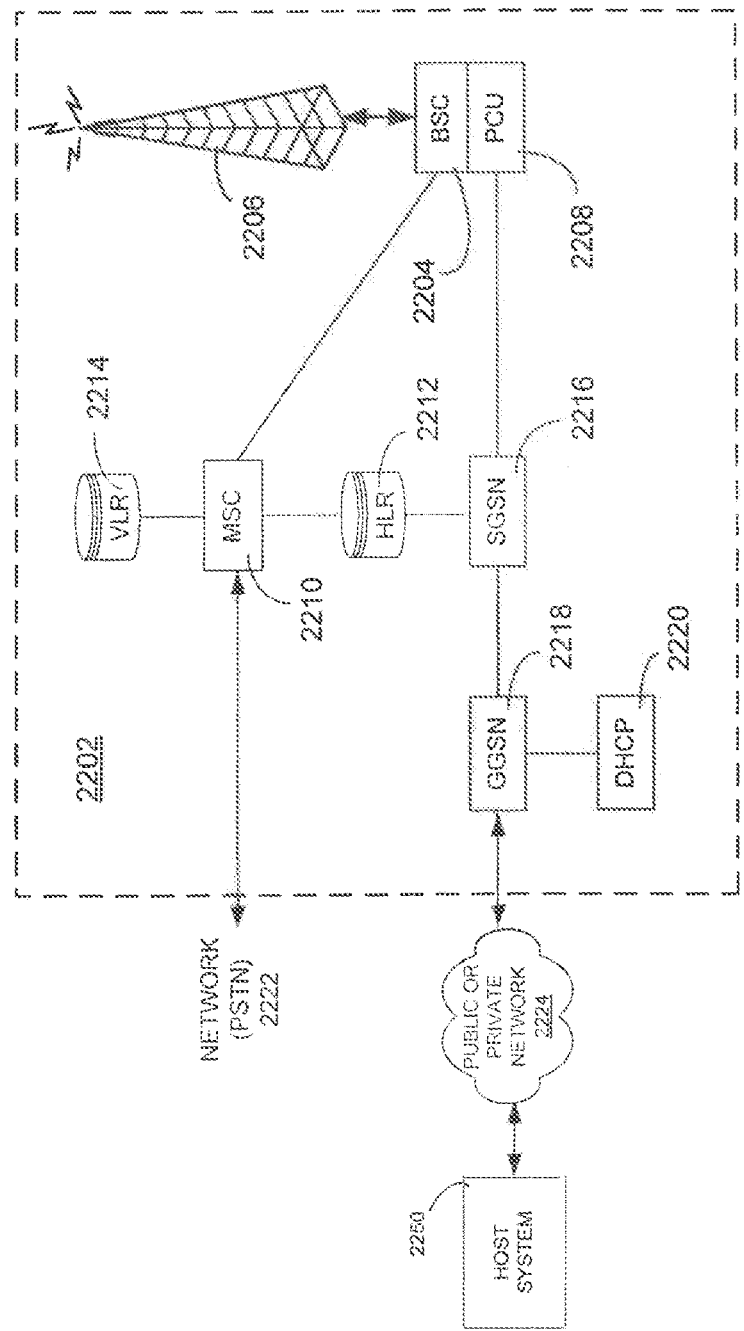
FIG. 14 is an example block diagram of a node of a wireless network.

Referring now to FIG. 14, a block diagram of an example implementation of a node 2202 of the wireless network 2200 is shown. In practice, the wireless network 2200 comprises one or more nodes 2202. In conjunction with the connect module 2144, the mobile device 2100 can communicate with the node 2202 within the wireless network 2200. In the example implementation of FIG. 14, the node 2202 is configured in accordance with General Packet Radio Service (GPRS) and Global Systems for Mobile (GSM) technologies. The node 2202 includes a base station controller (BSC) 2204 with an associated tower station 2206, a Packet Control Unit (PCU) 2208 added for GPRS support in GSM, a Mobile Switching Center (MSC) 2210, a Home Location Register (HLR) 2212, a Visitor Location Registry (VLR) 2214, a Serving GPRS Support Node (SGSN) 2216, a Gateway GPRS Support Node (GGSN) 2218, and a Dynamic Host Configuration Protocol (DHCP) server 2220. This list of components is not meant to be an exhaustive list of the components of every node 2202 within a GSM/GPRS network, but rather a list of components that are commonly used in communications through the network 2200.

In a GSM network, the MSC 2210 is coupled to the BSC 2204 and to a landline network, such as a Public Switched Telephone Network (PSTN) 2222 to satisfy circuit switched requirements. The connection through the PCU 2208, the SGSN 2216 and the GGSN 2218 to a public or private network (Internet) 2224 (also referred to herein generally as a shared network infrastructure) represents the data path for GPRS capable mobile devices. In a GSM network extended with GPRS capabilities, the BSC 2204 also contains the Packet Control Unit (PCU) 2208 that connects to the SGSN 2216 to control segmentation, radio channel allocation and to satisfy packet switched requirements. To track the location of the mobile device 2100 and availability for both circuit switched and packet switched management, the HLR 2212 is shared between the MSC 2210 and the SGSN 2216. Access to the VLR 2214 is controlled by the MSC 2210.

The station 2206 is a fixed transceiver station and together with the BSC 2204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 2206. The fixed transceiver equipment normally performs such functions as modulation and possibly encoding and/or encryption of signals to be transmitted to the mobile device 2100 in accordance with particular, usually predetermined, communication protocols and parameters, under control of its controller. The fixed transceiver equipment similarly demodulates and possibly decodes and decrypts, if necessary, any communication signals received from the mobile device 2100 within its cell. Communication protocols and parameters may vary between different nodes. For example, one node may employ a different modulation scheme and operate at different frequencies than other nodes.

For all mobile devices 2100 registered with a specific network, permanent configuration data such as a user profile is stored in the HLR 2212. The HLR 2212 also contains location information for each registered mobile device and can be queried to determine the current location of a mobile device. The MSC 2210 is responsible for a group of location areas and stores the data of the mobile devices currently in its area of responsibility in the VLR 2214. Further, the VLR 2214 also contains information on mobile devices that are visiting other networks. The information in the VLR 2214 includes part of the permanent mobile device data transmitted from the HLR 2212 to the VLR 2214 for faster access. By moving additional information from a remote HLR 2212 node to the VLR 2214, the amount of traffic between these nodes can be reduced so that voice and data services can be provided with faster response times and at the same time requiring less use of computing resources.

The SGSN 2216 and the GGSN 2218 are elements added for GPRS support; namely packet switched data support, within GSM. The SGSN 2216 and the MSC 2210 have similar responsibilities within the wireless network 2200 by keeping track of the location of each mobile device 2100. The SGSN 2216 also performs security functions and access control for data traffic on the wireless network 2200. The GGSN 2218 provides internetworking connections with external packet switched networks and connects to one or more SGSN's 2216 via an Internet Protocol (IP) backbone network operated within the network 2200. During normal operations, a given mobile device 2100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 2220 connected to the GGSN 2218. There are many mechanisms for dynamic IP assignment, including using a combination of a Remote Authentication Dial-In User Service (RADIUS) server and a DHCP server. Once the GPRS Attach is complete, a logical connection is established from a mobile device 2100, through the PCU 2208, and the SGSN 2216 to an Access Point Node (APN) within the GGSN 2218. The APN represents a logical end of an IP tunnel that can either access direct Internet compatible services or private network connections. The APN also represents a security mechanism for the network 2200, insofar as each mobile device 2100 must be assigned to one or more APNs and mobile devices 2100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 2200. To maximize use of the PDP Contexts, the network 2200 will run an idle timer for each PDP Context to determine if there is a lack of activity. When a mobile device 2100 is not using its PDP Context, the PDP Context can be de-allocated and the IP address returned to the IP address pool managed by the DHCP server 2220.

Figure 15:
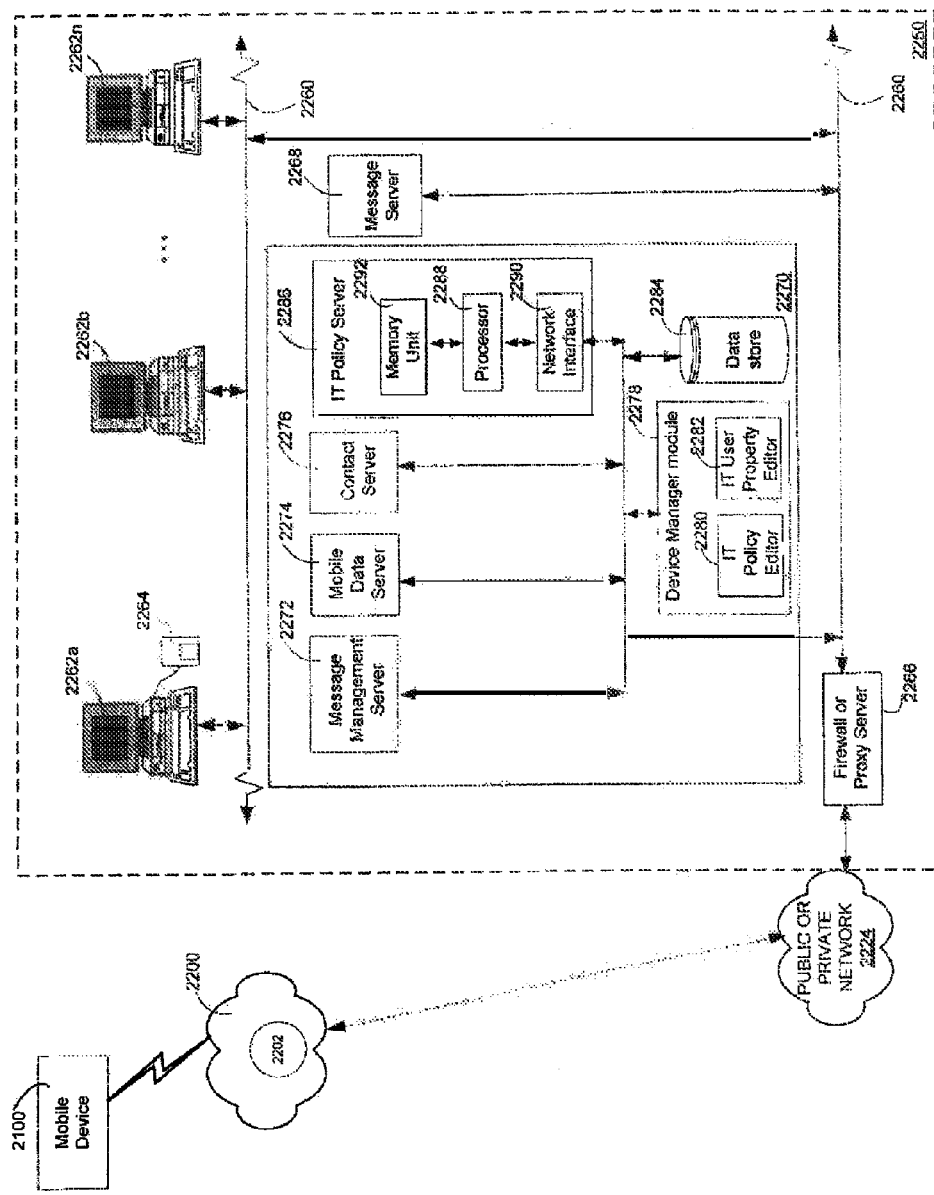
FIG. 15 is a block diagram illustrating components of a host system in one example configuration for use with the wireless network of FIG. 14 and the mobile device of FIG. 12.

Referring now to FIG. 15, shown therein is a block diagram illustrating components of an example configuration of a host system 2250 that the mobile device 2100 can communicate with in conjunction with the connect module 2144. The host system 2250 will typically be a corporate enterprise or other local area network (LAN), but may also be a home office computer or some other private system, for example, in variant implementations. In this example shown in FIG. 15, the host system 2250 is depicted as a LAN of an organization to which a user of the mobile device 2100 belongs. Typically, a plurality of mobile devices can communicate wirelessly with the host system 2250 through one or more nodes 2202 of the wireless network 2200.

The host system 2250 comprises a number of network components connected to each other by a network 2260. For instance, a user's desktop computer 2262a with an accompanying cradle 2264 for the user's mobile device 2100 is situated on a LAN connection. The cradle 2264 for the mobile device 2100 can be coupled to the computer 2262a by a serial or a Universal Serial Bus (USB) connection, for example. Other user computers 2262b-2262n are also situated on the network 2260, and each may or may not be equipped with an accompanying cradle 2264. The cradle 2264 facilitates the loading of information (e.g., PIM data, private symmetric encryption keys to facilitate secure communications) from the user computer 2262a to the mobile device 2100, and may be particularly useful for bulk information updates often performed in initializing the mobile device 2100 for use. The information downloaded to the mobile device 2100 may include certificates used in the exchange of messages.

It will be understood by persons skilled in the art that the user computers 2262a-2262n will typically also be connected to other peripheral devices, such as printers, etc. which are not explicitly shown in FIG. 15. Furthermore, only a subset of network components of the host system 2250 are shown in FIG. 15 for ease of exposition, and it will be understood by persons skilled in the art that the host system 2250 will comprise additional components that are not explicitly shown in FIG. 15 for this example configuration. More generally, the host system 2250 may represent a smaller part of a larger network (not shown) of the organization, and may comprise different components and/or be arranged in different topologies than that shown in the example embodiment of FIG. 15.

To facilitate the operation of the mobile device 2100 and the wireless communication of messages and message-related data between the mobile device 2100 and components of the host system 2250, a number of wireless communication support components 2270 can be provided. In some implementations, the wireless communication support components 2270 can include a message management server 2272, a mobile data server 2274, a contact server 2276, and a device manager module 2278. The device manager module 2278 includes an IT Policy editor 2280 and an IT user property editor 2282, as well as other software components for allowing an IT administrator to configure the mobile devices 2100. In an alternative embodiment, there may be one editor that provides the functionality of both the IT policy editor 2280 and the IT user property editor 2282. The support components 2270 also include a data store 2284, and an IT policy server 2286. The IT policy server 2286 includes a processor 2288, a network interface 2290 and a memory unit 2292. The processor 2288 controls the operation of the IT policy server 2286 and executes functions related to the standardized IT policy as described below. The network interface 2290 allows the IT policy server 2286 to communicate with the various components of the host system 2250 and the mobile devices 2100. The memory unit 2292 can store functions used in implementing the IT policy as well as related data. Those skilled in the art know how to implement these various components. Other components may also be included as is well known to those skilled in the art. Further, in some implementations, the data store 2284 can be part of any one of the servers.

In this example embodiment, the mobile device 2100 communicates with the host system 2250 through node 2202 of the wireless network 2200 and a shared network infrastructure 2224 such as a service provider network or the public Internet. Access to the host system 2250 may be provided through one or more routers (not shown), and computing devices of the host system 2250 may operate from behind a firewall or proxy server 2266. The proxy server 2266 provides a secure node and a wireless internet gateway for the host system 2250. The proxy server 2266 intelligently routes data to the correct destination server within the host system 2250.

In some implementations, the host system 2250 can include a wireless VPN router (not shown) to facilitate data exchange between the host system 2250 and the mobile device 2100. The wireless VPN router allows a VPN connection to be established directly through a specific wireless network to the mobile device 2100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can be a Transmission Control Protocol (TCP)/IP or User Datagram Protocol (UDP)/IP connection for delivering the messages directly to the mobile device 2100 in this alternative implementation.

Messages intended for a user of the mobile device 2100 are initially received by a message server 2268 of the host system 2250. Such messages may originate from any number of sources. For instance, a message may have been sent by a sender from the computer 2262b within the host system 2250, from a different mobile device (not shown) connected to the wireless network 2200 or a different wireless network, or from a different computing device, or other device capable of sending messages, via the shared network infrastructure 2224, possibly through an application service provider (ASP) or Internet service provider (ISP), for example.

The message server 2268 typically acts as the primary interface for the exchange of messages, particularly e-mail messages, within the organization and over the shared network infrastructure 2224. Each user in the organization that has been set up to send and receive messages is typically associated with a user account managed by the message server 2268. Some example implementations of the message server 2268 include a Microsoft Exchange™ server, a Lotus Domino™ server, a Novell Groupwise™ server, or another suitable mail server installed in a corporate environment. In some implementations, the host system 2250 may comprise multiple message servers 2268. The message server 2268 may also be adapted to provide additional functions beyond message management, including the management of data associated with calendars and task lists, for example.

When messages are received by the message server 2268, they are typically stored in a data store associated with the message server 2268. In at least some embodiments, the data store may be a separate hardware unit, such as data store 2284, that the message server 2268 communicates with. Messages can be subsequently retrieved and delivered to users by accessing the message server 2268. For instance, an e-mail client application operating on a user's computer 2262a may request the e-mail messages associated with that user's account stored on the data store associated with the message server 2268. These messages are then retrieved from the data store and stored locally on the computer 2262a. The data store associated with the message server 2268 can store copies of each message that is locally stored on the mobile device 2100. Alternatively, the data store associated with the message server 2268 can store all of the messages for the user of the mobile device 2100 and only a smaller number of messages can be stored on the mobile device 2100 to conserve memory. For instance, the most recent messages (i.e., those received in the past two to three months for example) can be stored on the mobile device 2100.

When operating the mobile device 2100, the user may wish to have e-mail messages retrieved for delivery to the mobile device 2100. The messaging application 2138 operating on the mobile device 2100 may also request messages associated with the user's account from the message server 2268. The messaging application 2138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 2100 is assigned its own e-mail address, and messages addressed specifically to the mobile device 2100 are automatically redirected to the mobile device 2100 as they are received by the message server 2268.

The message management server 2272 can be used to specifically provide support for the management of messages, such as e-mail messages, that are to be handled by mobile devices. Generally, while messages are still stored on the message server 2268, the message management server 2272 can be used to control when, if, and how messages are sent to the mobile device 2100. The message management server 2272 also facilitates the handling of messages composed on the mobile device 2100, which are sent to the message server 2268 for subsequent delivery.

For example, the message management server 2272 may monitor the user's "mailbox" (e.g., the message store associated with the user's account on the message server 2268) for new e-mail messages, and apply user-definable filters to new messages to determine if and how the messages are relayed to the user's mobile device 2100. The message management server 2272 may also compress and encrypt new messages (e.g., using an encryption technique such as Data Encryption Standard (DES), Triple DES, or Advanced Encryption Standard (AES)) and push them to the mobile device 2100 via the shared network infrastructure 2224 and the wireless network 2200. The message management server 2272 may also receive messages composed on the mobile device 2100 (e.g., encrypted using Triple DES), decrypt and decompress the composed messages, re-format the composed messages if desired so that they will appear to have originated from the user's computer 2262a, and re-route the composed messages to the message server 2268 for delivery.

Certain properties or restrictions associated with messages that are to be sent from and/or received by the mobile device 2100 can be defined (e.g., by an administrator in accordance with IT policy) and enforced by the message management server 2272. These may include whether the mobile device 2100 may receive encrypted and/or signed messages, minimum encryption key sizes, whether outgoing messages must be encrypted and/or signed, and whether copies of all secure messages sent from the mobile device 2100 are to be sent to a pre-defined copy address, for example.

The message management server 2272 may also be adapted to provide other control functions, such as only pushing certain message information or pre-defined portions (e.g., "blocks") of a message stored on the message server 2268 to the mobile device 2100. For example, in some cases, when a message is initially retrieved by the mobile device 2100 from the message server 2268, the message management server 2272 may push only the first part of a message to the mobile device 2100, with the part being of a pre-defined size (e.g., 22 KB). The user can then request that more of the message be delivered in similar-sized blocks by the message management server 2272 to the mobile device 2100, possibly up to a maximum pre-defined message size. Accordingly, the message management server 2272 facilitates better control over the type of data and the amount of data that is communicated to the mobile device 2100, and can help to minimize potential waste of bandwidth or other resources.

The mobile data server 2274 encompasses any other server that stores information that is relevant to the corporation. The mobile data server 2274 may include, but is not limited to, databases, online data document repositories, customer relationship management (CRM) systems, or enterprise resource planning (ERP) applications.

The contact server 2276 can provide information for a list of contacts for the user in a similar fashion as the address book on the mobile device 2100. Accordingly, for a given contact, the contact server 2276 can include the name, phone number, work address and e-mail address of the contact, among other information. The contact server 2276 can also provide a global address list that contains the contact information for all of the contacts associated with the host system 2250.

It will be understood by persons skilled in the art that the message management server 2272, the mobile data server 2274, the contact server 2276, the device manager module 2278, the data store 2284 and the IT policy server 2286 do not need to be implemented on separate physical servers within the host system 2250. For example, some or all of the functions associated with the message management server 2272 may be integrated with the message server 2268, or some other server in the host system 2250. Alternatively, the host system 2250 may comprise multiple message management servers 2272, particularly in variant implementations where a large number of mobile devices need to be supported.

Alternatively, in some embodiments, the IT policy server 2286 can provide the IT policy editor 2280, the IT user property editor 2282 and the data store 2284. In some cases, the IT policy server 2286 can also provide the device manager module 2278. The processor 2288 of the IT policy server 2286 can be used to perform the various steps of a method for providing IT policy data that is customizable on a per-user basis. The processor 2288 can execute the editors 2280 and 2282. In some cases, the functionality of the editors 2280 and 2282 can be provided by a single editor. In some cases, the memory unit 2292 can provide the data store 2284.

The device manager module 2278 provides an IT administrator with a graphical user interface with which the IT administrator interacts to configure various settings for the mobile devices 2100. As mentioned, the IT administrator can use IT policy rules to define behaviors of certain applications on the mobile device 2100 that are permitted such as phone, web browser or Instant Messenger use. The IT policy rules can also be used to set specific values for configuration settings that an organization requires on the mobile devices 2100 such as auto signature text, WLAN/VoIP/VPN configuration, security requirements (e.g., encryption algorithms, password rules, etc.), specifying themes or applications that are allowed to run on the mobile device 2100, and the like.

According to one aspect of this disclosure, a method of updating a data-store associated with an electronic communications device includes wirelessly communicating an electronic message and identifying a location identifier within the electronic message, the location identifier representative of a physical location. The method further includes measuring a physical location of the electronic communications device, validating the location identifier when the measured physical location is calculated to be within a threshold distance of the physical location represented by the location identifier, and initiating creation of a new data record in the data-store. The new data record stores at least the validated location identifier and a time identifier.

According to another aspect of this disclosure, an electronic communications device includes a communication subsystem for wirelessly communicating electronic messages, a positioning subsystem for measuring a physical location of the electronic communications device, an input interface for composing electronic messages, and a display for displaying electronic messages. The electronic communications device further includes a processor configured to identify a location identifier within a communicated electronic message, the location identifier representative of a physical location. The processor is further configured to cause the positioning subsystem to measure a physical location of the mobile electronic communications device, validate the location identifier when the measured physical location is calculated to be within a threshold distance of the physical location represented by the location identifier, and initiate creation of a new data record in a data-store. The new data record stores at least the validated location identifier and a time identifier.

According to another aspect of this disclosure, a non-transitory computer-readable medium includes program code executable by a processor of an electronic communications device to identify a location identifier within a communicated electronic message. The location identifier is representative of a physical location. The program code further causes a positioning subsystem of the electronic communications device to measure a physical location of the electronic communications device and validate the location identifier when the measured physical location is calculated to be within a threshold distance of the physical location represented by the location identifier. The program code further initiates creation of a new data record in a data-store. The new data record stores at least the validated location identifier and a time identifier.

According to another aspect of this disclosure, the physical location is measured automatically in response to identification of the location identifier within the electronic message.

According to another aspect of this disclosure, the location identifier is validated automatically in response to identification of the location identifier within the received electronic message.

According to another aspect of this disclosure, a prompt of the validated location identifier is displayed.

According to another aspect of this disclosure, the location identifier is highlighted within the electronic message.

According to another aspect of this disclosure, initiating creation of the new data record is performed automatically in response to the validation of the location identifier.

According to another aspect of this disclosure, identifying the location identifier includes comparing words contained in a body of the electronic message to an electronically stored lexicon.

According to another aspect of this disclosure, the time identifier is identified within the electronic message or within another wirelessly communicated electronic message.

According to another aspect of this disclosure, the time identifier is calculated using a measured time, the measured physical location, and the physical location represented by the location identifier.

According to another aspect of this disclosure, an affirmation identifier is identified within the electronic message or within another wirelessly communicated electronic message and initiating creation of the new data record is in response to identifying the affirmation identifier.

While the foregoing provides certain non-limiting example embodiments, it should be understood that combinations, subsets, and variations of the foregoing are contemplated. The monopoly sought is defined by the claims.

What is claimed is:

1. A method of updating a data-store associated with an electronic communications device, the method comprising a processor:
   obtaining a communicated electronic message;
   identifying a location identifier within the electronic message, the location identifier representative of a physical location;
   determining a physical location of the electronic communications device;
   validating the location identifier when the determined physical location is determined to be within a threshold distance of the physical location represented by the location identifier; and
   initiating creation of a new data record in the data-store when the location identifier is validated, the new data record storing at least the validated location identifier and a time identifier.

2. The method of claim 1, wherein the determining the physical location is performed automatically in response to identification of the location identifier within the electronic message.

3. The method of claim 1, wherein the validating of the location identifier is performed automatically in response to identification of the location identifier within the received electronic message.

4. The method of claim 1 further comprising displaying a prompt of the validated location identifier.

5. The method of claim 1, wherein the location identifier is highlighted within the electronic message.

6. The method of claim 1, wherein the initiating of creation of the new data record is performed automatically in response to the validation of the location identifier.

7. The method of claim 1, wherein identifying the location identifier comprises comparing words contained in a body of the electronic message to an electronically stored lexicon.

8. The method of claim 1 further comprising identifying the time identifier within the electronic message or another wirelessly communicated electronic message.

9. The method of claim 1 further comprising determining the time identifier using a determined time, the determined physical location, and the physical location represented by the location identifier.

10. The method of claim 1 further comprising identifying an affirmation identifier within the electronic message or another wirelessly communicated electronic message, and initiating creation of the new data record in response to identifying the affirmation identifier.

11. An electronic communications device comprising:
   a communication subsystem for wirelessly communicating electronic messages;
   a positioning subsystem for determining a physical location of the electronic communications device;
   an input interface for composing electronic messages;
   a display for displaying electronic messages; and
   a processor configured to:
      identify a location identifier within a communicated electronic message, the location identifier representative of a physical location;
      cause the positioning subsystem to determine a physical location of the mobile electronic communications device;
      validate the location identifier when the determined physical location is determined to be within a threshold distance of the physical location represented by the location identifier; and
      initiate creation of a new data record in a data-store when the location identifier is validated, the new data record storing at least the validated location identifier and a time identifier.

12. The device of claim 11, wherein the processor is further configured to determine the physical location automatically in response to identification of the location identifier within the electronic message.

13. The device of claim 11, wherein the processor is further configured to validate the location identifier automatically in response to identification of the location identifier within the received electronic message.

14. The device of claim 11, wherein the processor is further configured to cause the display to display a prompt of the validated location identifier.

15. The device of claim 11, wherein the location identifier is highlighted within the electronic message.

16. The device of claim 11, wherein processor is further configured to initiate creation of the new data record automatically in response to the validation of the location identifier.

17. The device of claim 11, wherein the processor is further configured to compare words contained in a body of the electronic message to an electronically stored lexicon to identify the location identifier.

18. The device of claim 11, wherein the processor is further configured to identify the time identifier within the electronic message or another wirelessly communicated electronic message.

19. The device of claim 11, wherein the processor is further configured to determine the time identifier using a determined time, the determined physical location, and the physical location represented by the location identifier.

20. The device of claim 11, wherein the processor is further configured to identify an affirmation identifier within the electronic message or another wirelessly communicated electronic message, and initiate creation of the new data record in response to identifying the affirmation identifier.

21. A non-transitory computer-readable medium comprising program code executable by a processor of an electronic communications device to:

identify a location identifier within a communicated electronic message, the location identifier representative of a physical location;

cause a positioning subsystem of the electronic communications device to determine a physical location of the electronic communications device;

validate the location identifier when the determined physical location is determined to be within a threshold distance of the physical location represented by the location identifier; and initiate creation of a new data record in a data-store when the location identifier is validated, the new data record storing at least the validated location identifier and a time identifier.

* * * * *